(12) United States Patent
Nakagawa

(10) Patent No.: US 8,063,977 B2
(45) Date of Patent: Nov. 22, 2011

(54) PHOTOSENSOR AND FOCUS DETECTING DEVICE

(75) Inventor: Kazuyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 504 days.

(21) Appl. No.: 11/936,223

(22) Filed: Nov. 7, 2007

(65) Prior Publication Data

US 2008/0117325 A1   May 22, 2008

(30) Foreign Application Priority Data

Nov. 16, 2006   (JP) .................................. 2006-310381

(51) Int. Cl.
  *H04N 5/232*    (2006.01)
  *G03B 13/32*    (2006.01)
(52) U.S. Cl. .......................................... 348/345; 396/89
(58) Field of Classification Search .................. 348/345, 348/362, 363, 372–376; 396/89–99
See application file for complete search history.

(56) References Cited

U.S. PATENT DOCUMENTS

| | | | |
|---|---|---|---|
| 6,188,845 B1 * | 2/2001 | Sensui | 396/114 |
| 6,229,568 B1 * | 5/2001 | Kawaguchi et al. | 348/350 |
| 6,670,992 B2 * | 12/2003 | Irie | 348/350 |
| 6,750,435 B2 * | 6/2004 | Ford | 250/201.2 |
| 7,477,306 B2 * | 1/2009 | Neaves | 348/308 |
| 2006/0187338 A1 * | 8/2006 | May et al. | 348/375 |

FOREIGN PATENT DOCUMENTS

| | | |
|---|---|---|
| JP | 01-45883 B2 | 10/1989 |
| JP | 02-555681 B2 | 9/1996 |
| JP | 2004-272238 A | 9/2004 |

* cited by examiner

*Primary Examiner* — Trung Diep
(74) *Attorney, Agent, or Firm* — Canon U.S.A., Inc. IP Division

(57) ABSTRACT

The arrangement of focus-detecting sensors for autofocus in multipoint range finding and the arrangement of light detection sensors for focus detecting regions are optimized. Further, the chip area and power consumption are reduced. Light detection sensors are provided on the sensor chip in a manner such as to be disposed between focus-detecting sensors provided on the same sensor chip.

14 Claims, 19 Drawing Sheets

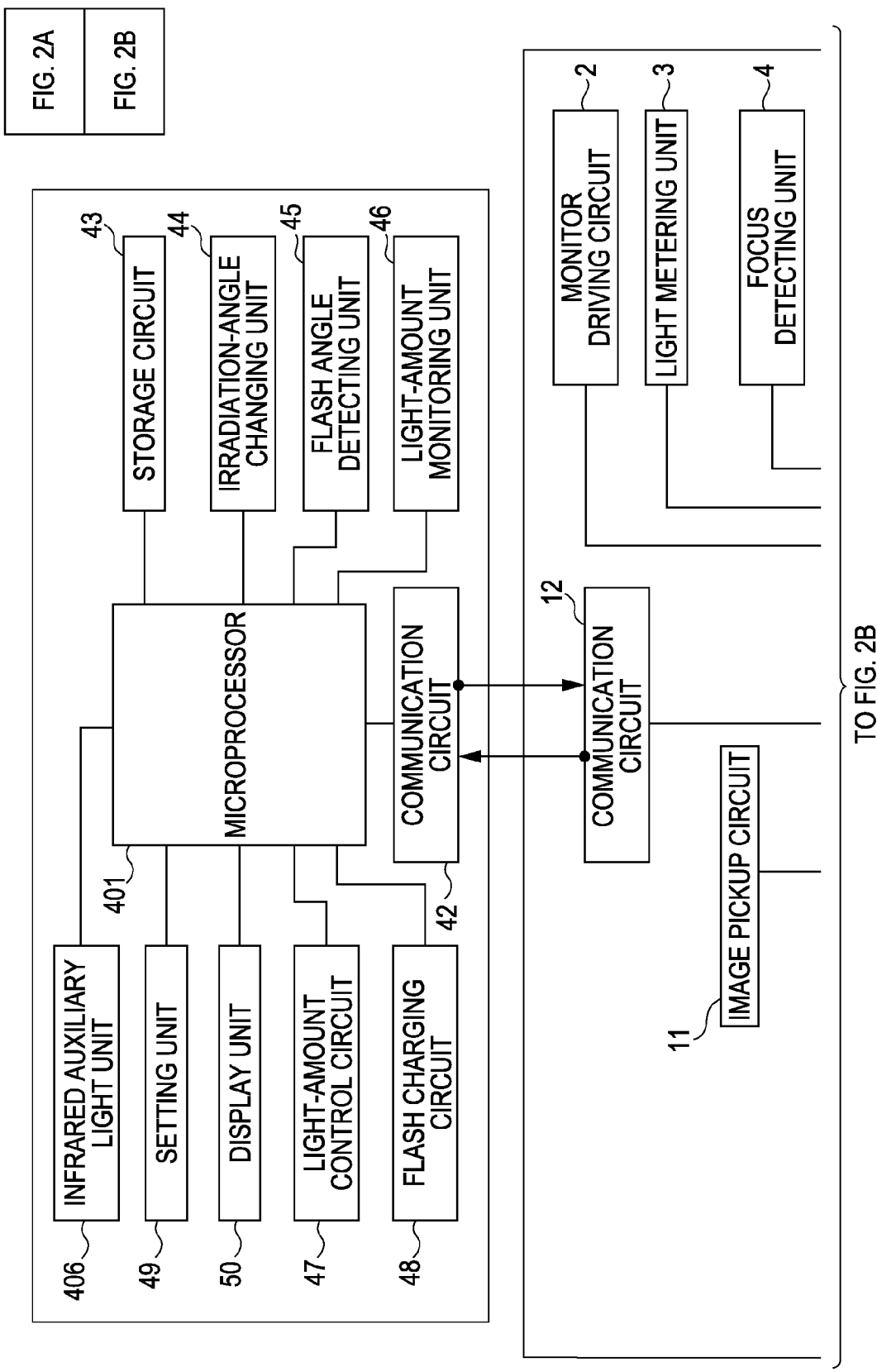

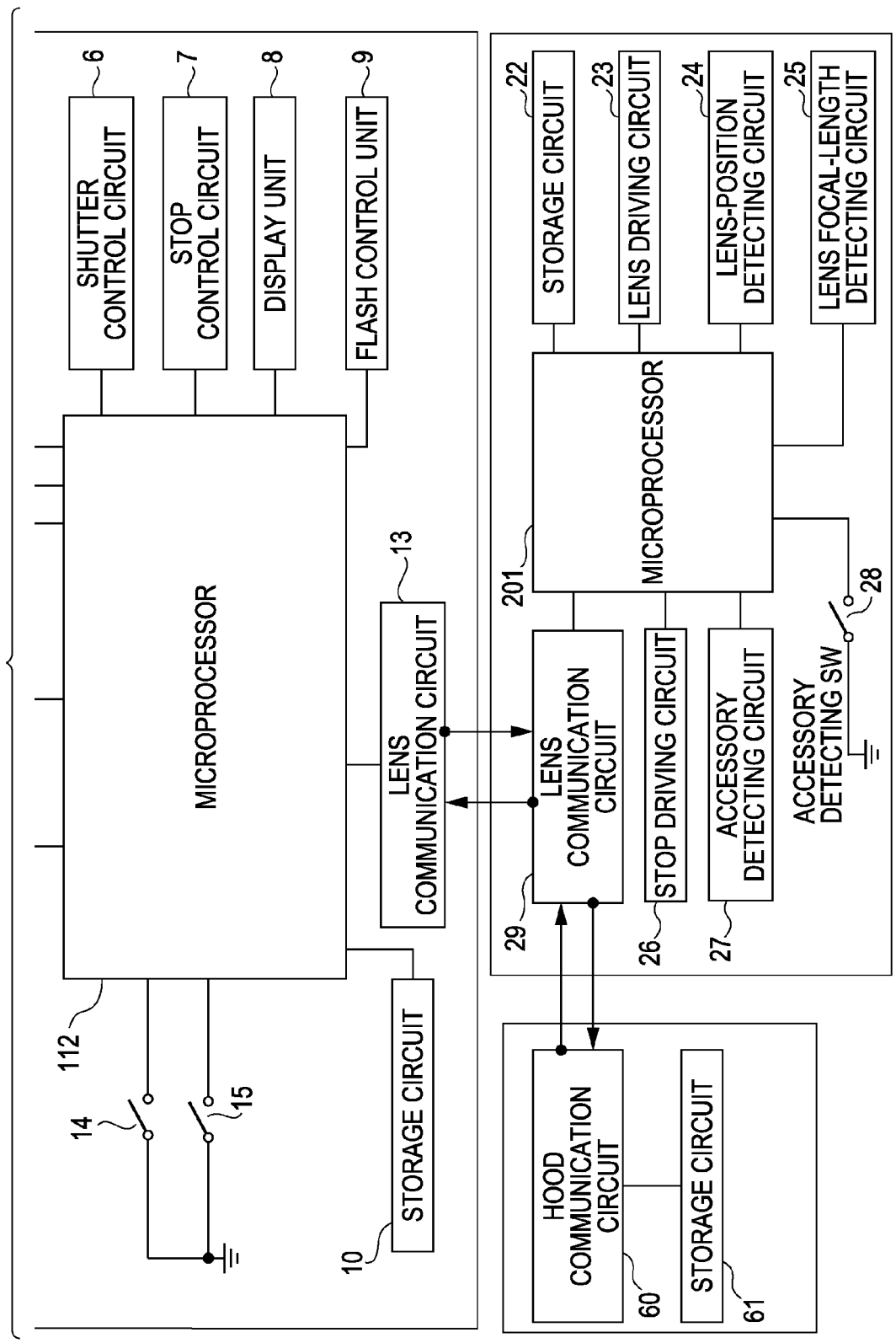

PHOTOSENSOR AND FOCUS DETECTING DEVICE

BACKGROUND OF THE INVENTION

1. Field of the Invention

The present invention relates to a photosensor for detecting the focus, a focus detecting device, and an image pickup apparatus.

2. Description of the Related Art

When the focus of an object at the same distance is detected with a phase-difference focus detecting device, the focus detection result varies (defocusing) in accordance with the wavelength because of chromatic aberration of an imaging optical system.

For this focus detecting device in which the focus detection result varies, for example, Japanese Patent Publication No. 1-45883 proposes a technique of detecting and correcting the variation in the focus detection result due to the difference of the light source by using a light-receiving section that detects the light source. In this focus detecting device, a signal corresponding to the infrared region and signals of other wavelength regions are detected, the defocus amount is calculated, and defocusing is corrected on the basis of the defocus amount.

Japanese Patent No. 2555681 proposes a focus detecting device in which first and second photodiodes for detecting the color temperature are disposed adjacent to a base portion and a reference portion of a focus-detecting photodiode array on the same chip. In this focus detecting device, the photodiode array and the first and second photodiodes receive almost the same object image.

Japanese Patent Laid-Open No. 2004-272238 discloses a focus detecting device in which a plurality of focus-detecting photoreceptors are provided corresponding to a plurality of optical systems and in which monitoring photoreceptors are provided adjacent to the focus-detecting photoreceptors.

In the technique disclosed in Japanese Patent Publication No. 1-45883, a photoreceptor that obtains a photoelectric signal indicating infrared light and a photoreceptor that obtains a photoelectric signal indicating light with other wavelengths are provided near photoreceptors that detect the focus of a light beam received from an imaging optical system that forms an object image. However, this publication does not describe the arrangement of the photoreceptors for a plurality of focus detecting fields. Japanese Patent 2555681 teaches that the photodiodes for detecting the color temperature are provided adjacent to the photodiode array, but does not describe the arrangement for a plurality of focus detecting fields.

In the focus detecting device disclosed in Japanese Patent Laid-Open No. 2004-272238, a monitoring photoreceptor is provided for each focus detecting photoreceptor. However, with the increase in number of distance measuring fields of the focus detecting device, the number of focus-detecting photoreceptors increases, and the number of monitoring photoreceptors increases in proportion thereto. Consequently, the sizes of the sensor circuit and the sensor are increased.

SUMMARY OF THE INVENTION

The present invention has been made in consideration of the above situation, and is provided to reduce control circuits, to decrease the chip area of a photosensor, and to reduce power consumption.

According to an aspect of the present invention, the foregoing object is attained by providing a photosensor including a first focus detecting sensor and a second focus-detecting sensor configured to receive a light beam from an object so as to detect a first defocus amount of an imaging optical system from a pair of received optical images; a third focus-detecting sensor and a fourth focus-detecting sensor configured to receive a light beam from the object so as to detect a second defocus amount of the imaging optical system from a pair of received optical images; and a first light detection sensor configured to detect a wavelength component of the light beam. The first light detection sensor is disposed between the first and third focus-detecting sensors or between the second and fourth focus-detecting sensors.

Further features and aspects of the present invention will become apparent from the following description of exemplary embodiments with reference to the attached drawings.

BRIEF DESCRIPTION OF THE DRAWINGS

FIGS. 2A-B provide a block diagram showing an example electrical configuration of the image pickup apparatus.

DESCRIPTION OF THE EMBODIMENTS

Various embodiments, features and aspects of the present invention will now herein be described in detail in accordance with the accompanying drawings.

First Exemplary Embodiment

A first exemplary embodiment of the present invention will be described below.

Figure 1:
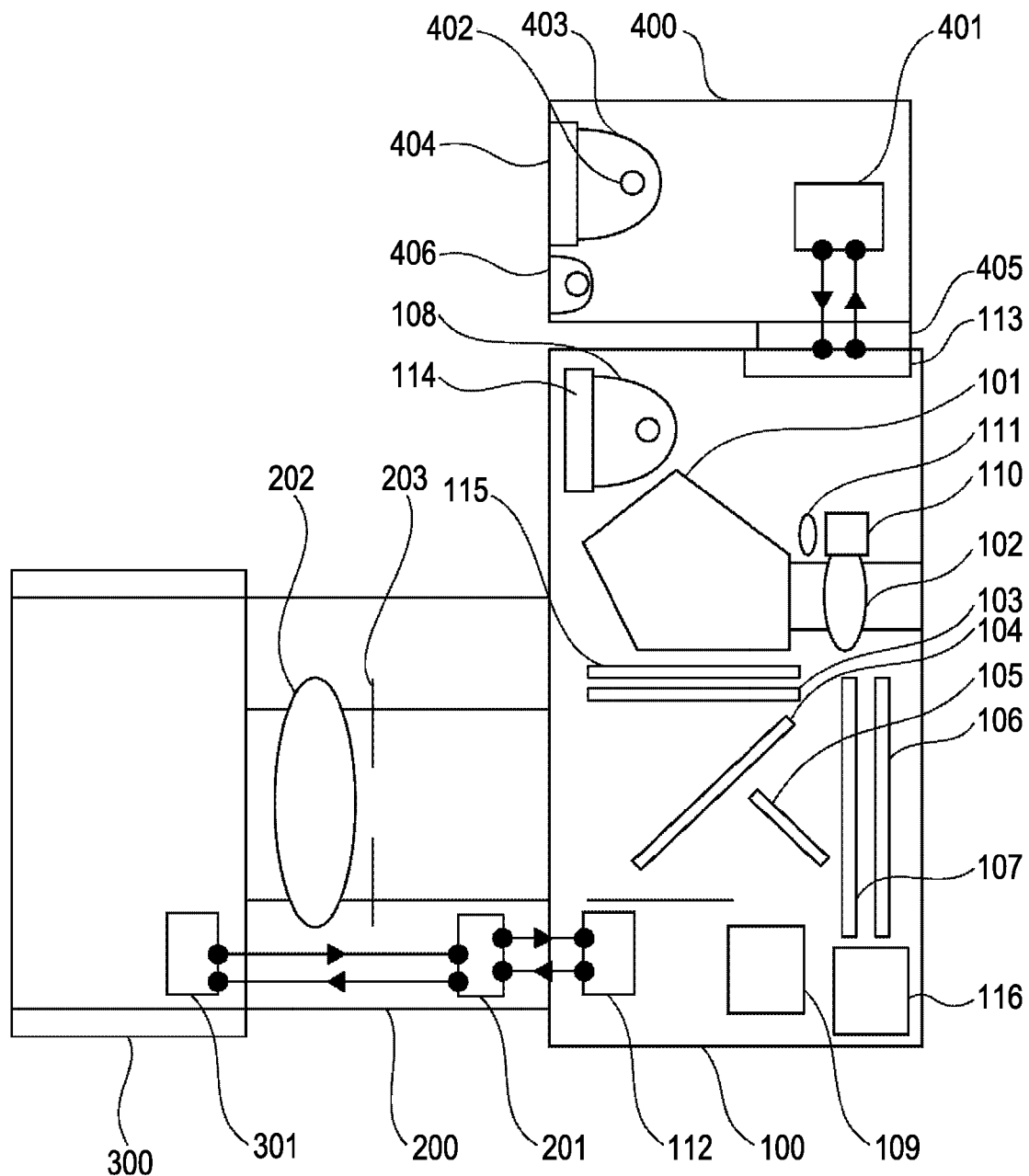
FIG. 1 is a schematic view showing an example configuration of an image pickup apparatus according to a first exemplary embodiment of the present invention.

FIG. 1 is a schematic view showing a configuration of an image pickup system according to the first exemplary embodiment. Referring to FIG. 1, the image pickup system includes an image pickup apparatus 100. The image pickup apparatus 100 includes the following components 101 to 116. That is, the image pickup apparatus 100 includes an erect-image optical system 101 that forms a finder optical system, an eyepiece 102, and a finder screen 103. A mirror 104 deflects a part of an imaging light beam toward the finder optical system 101. A mirror 105 deflects the imaging light beam passing through the mirror 104 toward a focus detecting device that will be described below. An image pickup element 106 controls an image pickup operation of the image pickup apparatus 100. A shutter 107 shields the image pickup element 106 from light. A built-in flash 108 is stored in the image pickup apparatus 100.

The image pickup element 106 receives a light beam traveling from an object via an interchangeable lens 200, and outputs an electrical signal corresponding to the light beam. A focus detecting device 109 includes a plurality of sensors (corresponding to sensors that will be described below) formed of a plurality of photoreceptors (corresponding to line sensors that will be described below), and detects the focus by a phase difference detecting method.

More specifically, a light beam passing through an exit pupil of a focus lens provided in the interchangeable lens 200 is divided in two, and the two divided light beams are respectively received by a pair of line sensors. Then, a difference between signals output from the line sensors corresponding to the amounts of light, that is, the relative positional difference of the light beam in the dividing direction is detected, thus obtaining the defocus amount of the focus lens. Therefore, once the focus detecting sensor stores the defocus amount, the amount and direction by and in which the focus lens should be moved can be obtained for correction.

A light metering device 110 measures the exposure of the image pickup apparatus 100. A lens 111 focuses a light beam from the object onto the light metering device 110. An image pickup control circuit (also referred to as a microprocessor) 112 controls the image pickup apparatus 100. An external flash, which will be described below, is attached to an accessory shoe 113. A Fresnel lens 114 is provided for the built-in flash 108. A finder display 115 interposes and displays information on an optical finder provided in the image pickup apparatus 100. An external display 116 displays various data outside the image pickup apparatus 100.

The interchangeable lens 200 serves as an image pickup optical system, and includes a lens control circuit (also referred to as a microprocessor) 201 that performs communication with a communication unit in the image pickup apparatus 100, a lens (image pickup optical system) 202 that takes an image, and an aperture stop 203 that adjusts the amount of light. The lens 202 includes a focus lens.

A lens hood 300 is attached to the interchangeable lens 200. The lens hood 300 includes a hood information storage circuit 301 that stores information about thereof.

An external flash 400 serving as an illumination unit includes an external flash control circuit (also referred to as a microprocessor) 401, a light emitter 402, a reflection umbrella 403, a flash panel 404, a mounting portion 405, and an infrared auxiliary light unit 406. The external flash control circuit 401 controls the external flash 400. The reflection umbrella 403 reflects a light beam from the light emitter 402 toward an object side. The flash panel 404 controls the distribution of the light beam reflected by the reflection umbrella 403. The mounting portion 405 is attached to the accessory shoe 113 of the image pickup apparatus 100. The infrared auxiliary light unit 406 is provided in the external flash 400.

FIG. 2 is a block diagram showing circuit configurations of the image pickup apparatus 100, the interchangeable lens 200, the lens hood 300, and the external flash 400 provided in the above-described image pickup system.

Referring to FIG. 2, the image pickup apparatus 100 includes the following components 112, 2 to 4, and 6 to 15. A microprocessor (image pickup control circuit) 112 controls the image pickup apparatus 100. A motor driving circuit 2 drives a movable section of the image pickup apparatus 100. A light metering unit 3 (included in the light metering device 110 shown in FIG. 1) measures the luminance of the object. A focus detecting unit 4 (included in the focus detecting device 109 shown in FIG. 1) detects the focus state of the interchangeable lens 200. A shutter control circuit 6 controls the exposure of the image pickup apparatus 100, and is provided in the shutter 107 shown in FIG. 1.

A stop control circuit 7 controls a light beam entering the image pickup apparatus 100, and controls the aperture stop 203 shown in FIG. 1. A display unit 8 displays the state of the image pickup apparatus 100, and includes the finder display 115 and the external display 116 shown in FIG. 1. A flash control circuit 9 controls the built-in flash 108 shown in FIG. 1. A storage circuit 10 stores the setting state of the image pickup apparatus 100. An image pickup circuit 11 performs an image pickup operation. A communication circuit 12 performs communication with accessories other than the interchangeable lens 200 that is attached to the image pickup apparatus 100. A lens communication circuit 13 performs communication with the interchangeable lens 200. A switch 14 (SW1) is used to start an image pickup preparatory operation, and a switch 15 (SW2) is used to start an image pickup operation.

The built-in flash 108 not only illuminates the object during an image pickup operation in a state in which the external flash 400 is not mounted, but also functions as auxiliary light with which the object is illuminated during focus detection.

The interchangeable lens 200 includes the following components 201 and 22 to 29. A microprocessor (lens control circuit) 201 controls the interchangeable lens 200. A storage circuit 22 holds the setting values of the interchangeable lens 200. A lens driving circuit 23 drives the interchangeable lens 200. A lens-position detecting circuit 24 detects the position of the interchangeable lens 200. A lens focal-length detecting circuit 25 detects a set focal length of the interchangeable lens 200. A stop driving circuit 26 is provided in the aperture stop 203 shown in FIG. 1, and drives the aperture stop 203. An accessory detecting circuit 27 detects the accessory attached to the interchangeable lens 200. An accessory detecting switch 28 is used to detect the accessory attached to the interchangeable lens 200. A lens communication circuit 29 performs communication with the image pickup apparatus 100 and the accessory attached to the interchangeable lens 200.

In the first exemplary embodiment, the lens communication circuit 29 receives a control command from the image pickup apparatus 100, and transmits shape information held in the interchangeable lens 200, information about the accessory attached to the interchangeable lens 200, and the lens setting value.

The external flash 400 serving as an accessory includes the following components. A microprocessor (external-flash control circuit) 401 controls the external flash 400. A communication circuit 42 performs communication with the image pickup apparatus 100. A storage circuit 43 holds the setting values of the external flash 400. An irradiation-angle changing unit 44 changes the flash irradiation angle range in accordance with the state of the image pickup apparatus 100 to which the external flash 400 is attached and the state of the interchangeable lens 200. A flash irradiation-angle detecting unit 45 detects a set flash irradiation range. A light-amount monitoring unit 46 directly monitors the amount of light emitted from the external flash 400. A light-amount control circuit 47 controls the amount of light from the external flash 400. A flash charging circuit 48 charges the external flash 400. A setting unit 49 sets the state of the external flash 400. A display unit 50 displays the set state of the external flash 400. An infrared auxiliary light unit 406 is provided in the external flash 400.

In the first exemplary embodiment, the communication circuit 42 exchanges setting information and control information about the external flash 400. Infrared light is emitted from the infrared auxiliary light unit 406 according to a command from the image pickup apparatus 100.

The lens hood 300 includes a hood communication circuit 60, and a storage circuit 61 that stores information about the lens hood 300. Information read out from the storage circuit 61 is input to the hood communication circuit 60 for the purpose of communication with the lens communication circuit 29.

Figure 3:
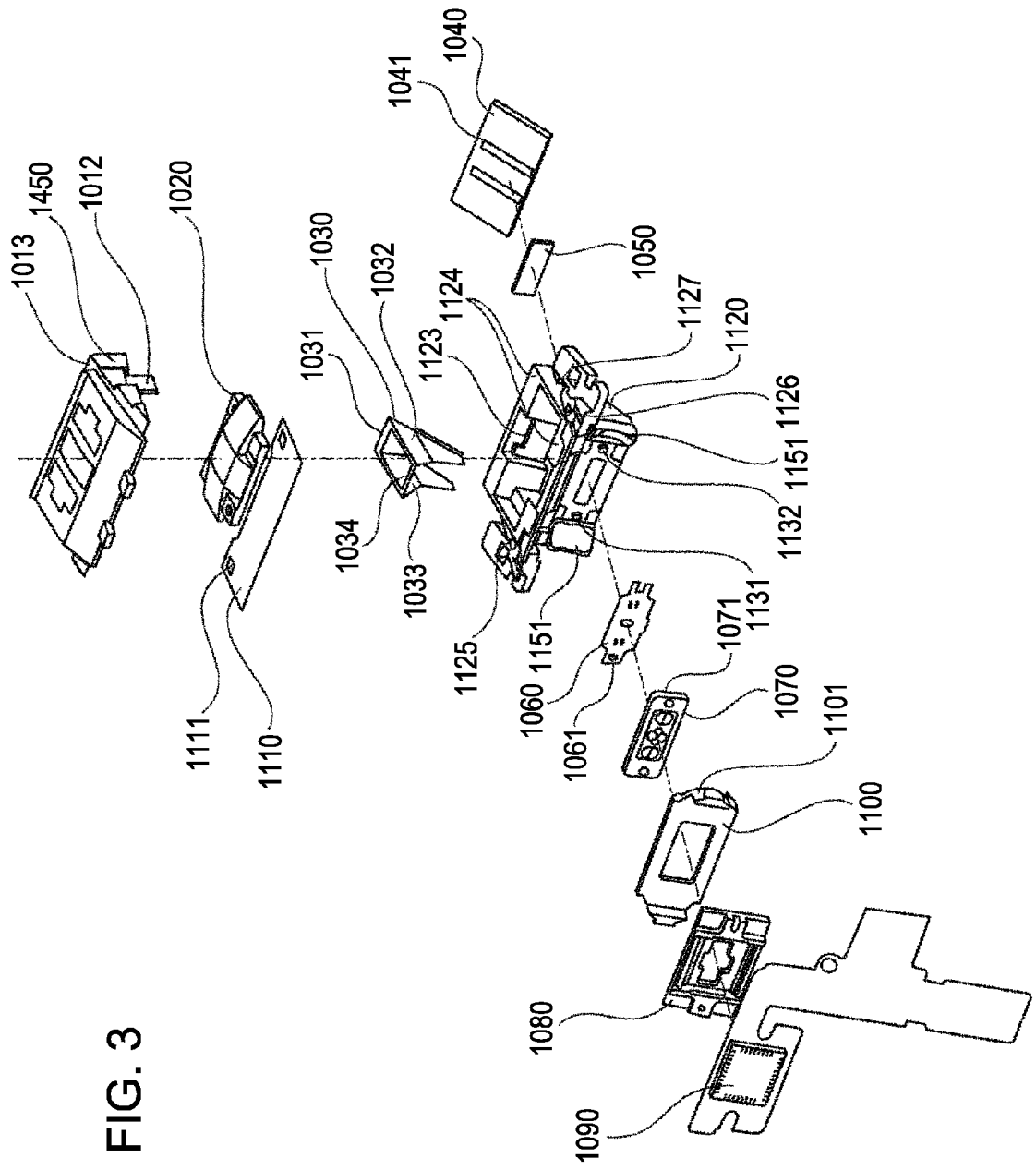
FIG. 3 is an exploded perspective view showing an example configuration of a focus detecting device in the first exemplary embodiment.

FIG. 3 is an exploded perspective view showing an example configuration of the focus detecting unit device 109 provided in the image pickup apparatus 100.

Referring to FIG. 3, a main block 1120 is used to position various components, and has various shapes for positioning and fixing. An infrared cut-off filter 1050 is positioned relative to the main block 1120. A light-shielding plate 1030 is positioned relative to the main block 1120 by a light-shielding-plate positioning and fixing portion 1031 provided in the light-shielding plate 1030 and a light-shielding-plate positioning and fixing portion 1123 provided in the main block 1120. The light-shielding plate 1030 is mounted in the main block 1120, and is fixed thereto by bonding. The light-shielding plate 1030 includes walls 1032 and 1033 that prevent an unnecessary light beam other than an effective beam passing through a split field lens 1020 in each focus detection field from entering a photoreceptor in other focus detection fields. An opening 1034 is provided between the walls 1032 and 1033, and the focus detecting beam passes therethrough. After adjustment, the split field lens 1020 is fixedly bonded to the main block 1120 by divided-field-lens fixing portions 1124 provided in the main block 1120.

A field mask 1450 is positioned relative to the main block 1120 by a pair of field-mask positioning fitting shafts and a pair of fitting holes provided in the main block 1120 so as to regulate the planar movement of the field mask 1450 in a mounting surface, that is, a field-mask positioning fitting hole 1125 and a field-mask positioning fitting slot 1126. A pair of field-mask fixing elastic claws 1012 provided in the field mask 1450 are engaged with a pair of field-mask fixing holes 1127 provided in the main block 1120, so that the field mask 1450 is fixed to the main block 1120. A field-mask lift preventing portion 1013 is provided in the field mask 1450 so as to prevent the field mask 1450 from lifting from the main block 1120 even if the field-mask fixing elastic claws 1012 are disengaged from the field-mask fixing holes 1127 after the focus detecting device 109 is mounted in the image pickup apparatus 100.

The field-mask lift preventing portion 1013 also serves to reduce the gap between a mirror box in the image pickup apparatus 100 and the focus detecting device 109.

A light-shielding sheet 1110 is positioned by a pair of light-shielding-plate positioning holes 1111 and a pair of light-shielding-sheet positioning shapes (not shown) provided in the field mask 1450. The light-shielding sheet 1110 is thereby sandwiched between the field mask 1450 and the main block 1120, and is fixed to the main block 1120.

A mirror 1040 is positioned by a mirror positioning and fixing portion (not shown) provided in the main block 1120, and is fixed to the main block 1120 by bonding. A light-shielding mask 1041 is provided on a surface of the mirror 1040. The light-shielding mask 1041 is shaped to shield the focus detecting fields from an unnecessary light beam. The light-shielding mask 1041 blocks an unnecessary light beam passing between the light-shielding plate 1030 and the mirror 1040 when the focus detecting beam is bent toward a photoreceptor that will be described below. The light-shielding mask 1041 is substantially parallel to the row direction of line sensors, which will be described below, corresponding to peripheral focus detecting fields, and a light-shielding pattern is not provided in the dividing direction of the focus detecting beam. Therefore, a ghost is not caused by reflection at a pattern edge.

An image-reforming lens 1070 is positioned by a fitting shaft 1071 and a pair of fitting holes, that is, an image-reforming lens positioning square hole 1131 and an image-reforming lens positioning slot 1132 provided in the main block 1120. The image-reforming lens 1070 is fixed to the main block 1120 by bonding. A multi-aperture stop 1060 is positioned relative to the image-reforming lens 1070 by a positioning portion 1061 provided corresponding to the fitting shaft 1071 of the image-reforming lens 1070. The multi-aperture stop 1060 is held on the main block 1120 by being clamped between the lens 1070 and the main block 1120.

A sensor support member 1100 is positioned by a main-block abutting shape 1101 and a sensor-support-member support shape 1151 so as to pivot according to a curvature R2 of the sensor-support-member support shape 1151 and a curvature R1 of the main-block abutting shape 1101. This allows adjustment of the tilting with respect to a plurality of axes. After various adjustments such as adjustment of the tilting of the sensor, the sensor support member 1100 is fixed to the main block 1120 by bonding.

A sensor 1090 is fixedly bonded to a sensor holder 1080 beforehand so as to form a sensor unit which is held on the main block 1120 with the sensor support member 1100 disposed therebetween, and is subjected to various adjustments, for example, adjustments of tilting and position of the sensor 1090. Subsequently, the sensor unit is fixed to the sensor support member 1100 by bonding. The sensor holder 1080 has grooves on a surface to which the sensor support member 1100 is bonded, and an adhesive is guided by the grooves.

Further it is noted that the configuration of the focus detecting device 109 shown in FIG. 3 is just exemplary, and is not limited thereto.

Figure 4:
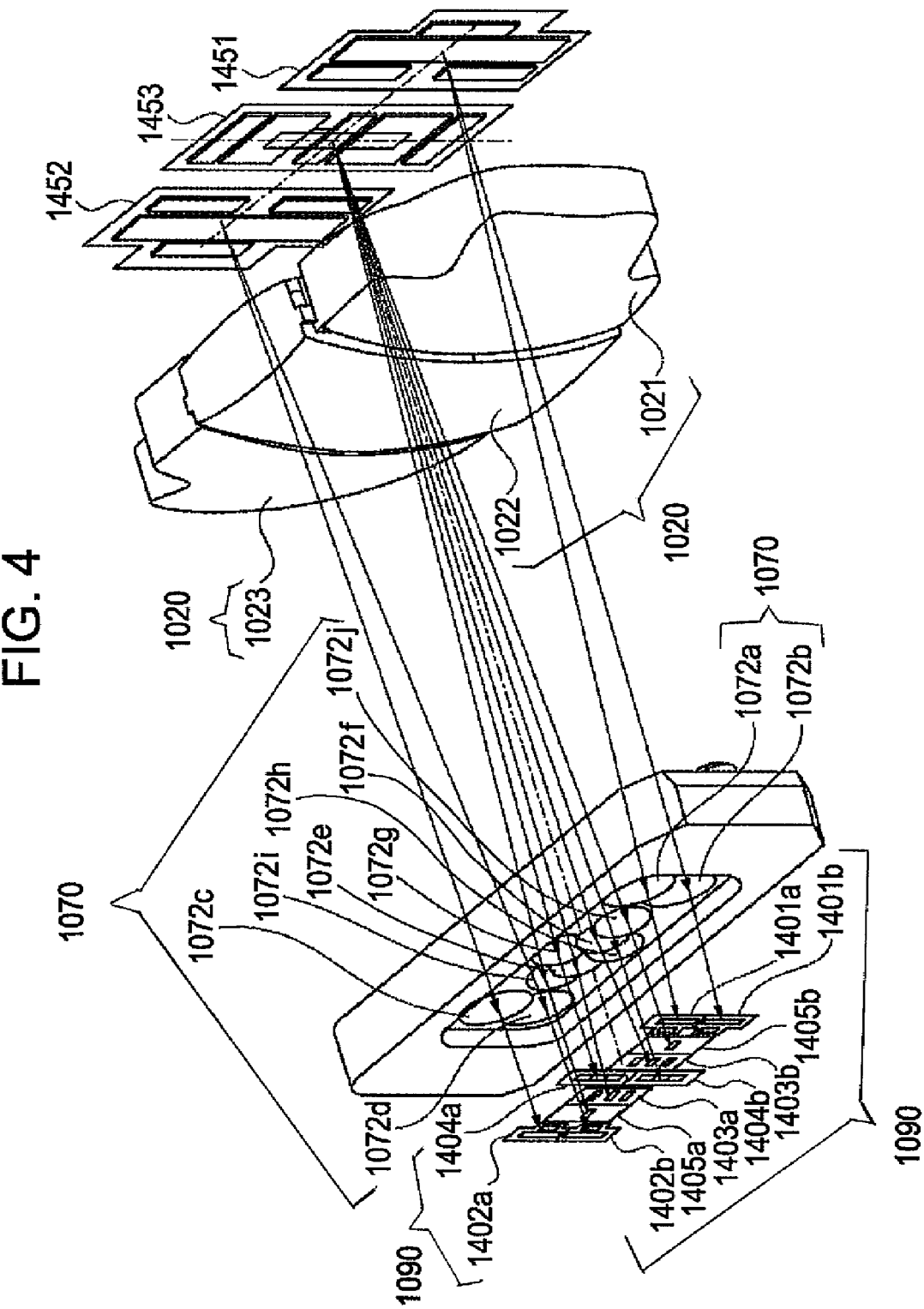
FIG. 4 is an explanatory view showing an example optical configuration of the focus detecting device.

An optical relationship of the focus detecting device 109 will be described below. FIG. 4 shows an optical configuration of the focus detecting device 109.

In FIG. 4, only main optical components of the focus detection unit 109, that is, the split field lens 1020, the image-reforming lens 1070, and the sensor 1090 are shown.

The split field lens 1020 includes a plurality of lens elements. In the first exemplary embodiment, the split field lens 1020 includes three lens elements 1021, 1022, and 1023.

The image-reforming lens 1070 includes a plurality of image-reforming lens elements 1072a to 1072j. Each image-reforming lens element reforms an image (optical image) of an object field, which is formed on a predetermined image plane of the image pickup apparatus 100, onto the sensor 1090. In FIG. 4, field-mask apertures 1451 to 1453 are projected as projection images 1401a to 1405a and 1401b to 1405b in a light-receiving region.

Figure 5:
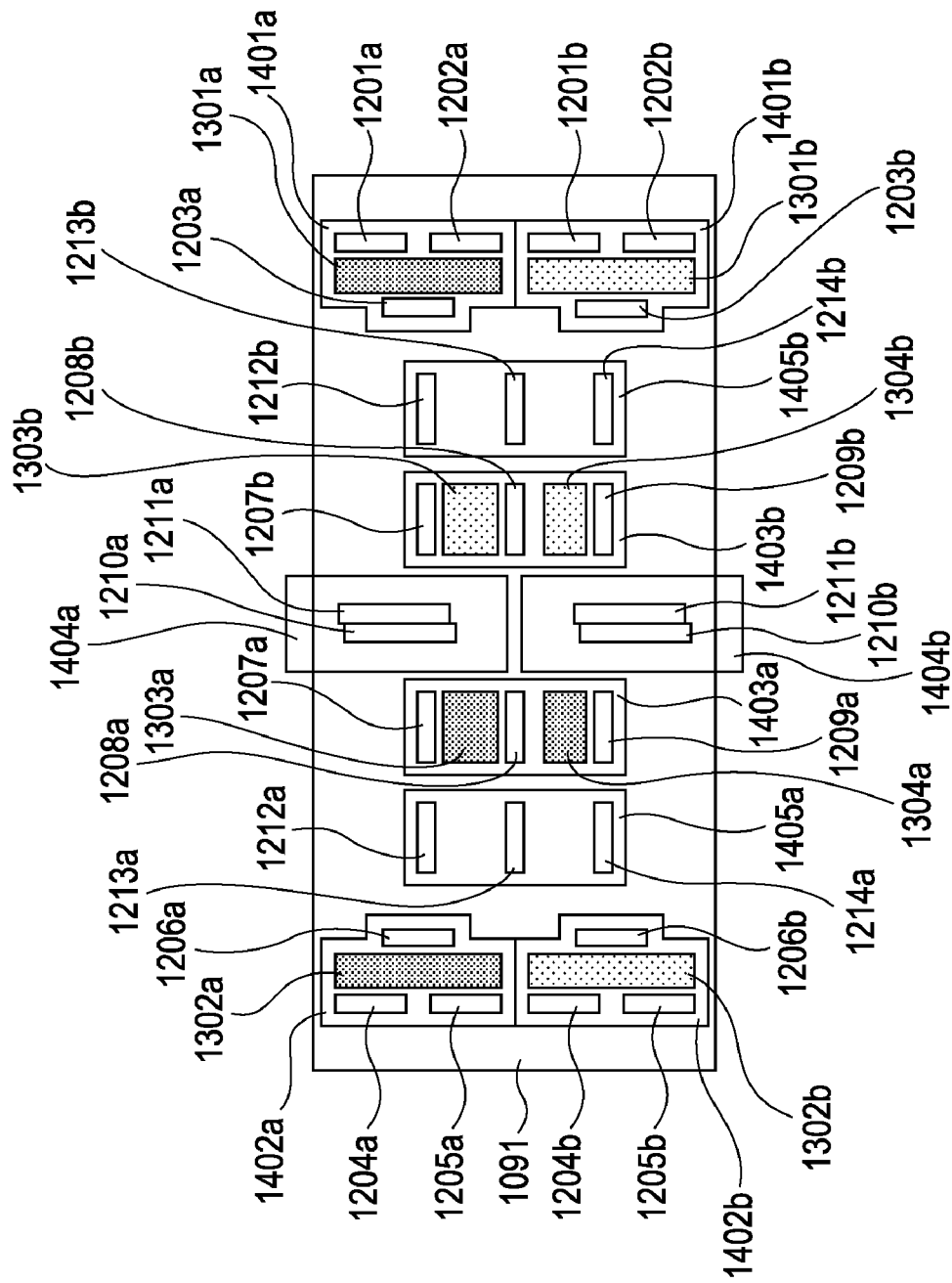
FIG. 5 is a schematic view showing an example configuration of a sensor provided in the focus detecting device.
Figure 6:
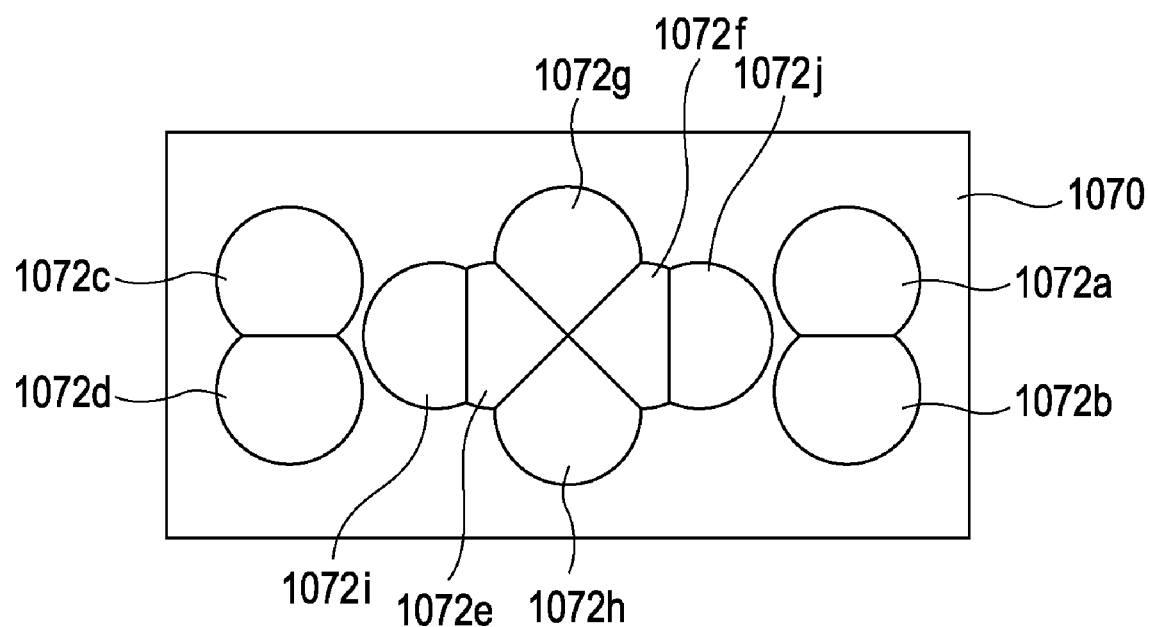
FIG. 6 is a schematic view of an example image-reforming lens provided in the focus detecting device.
Figure 7:
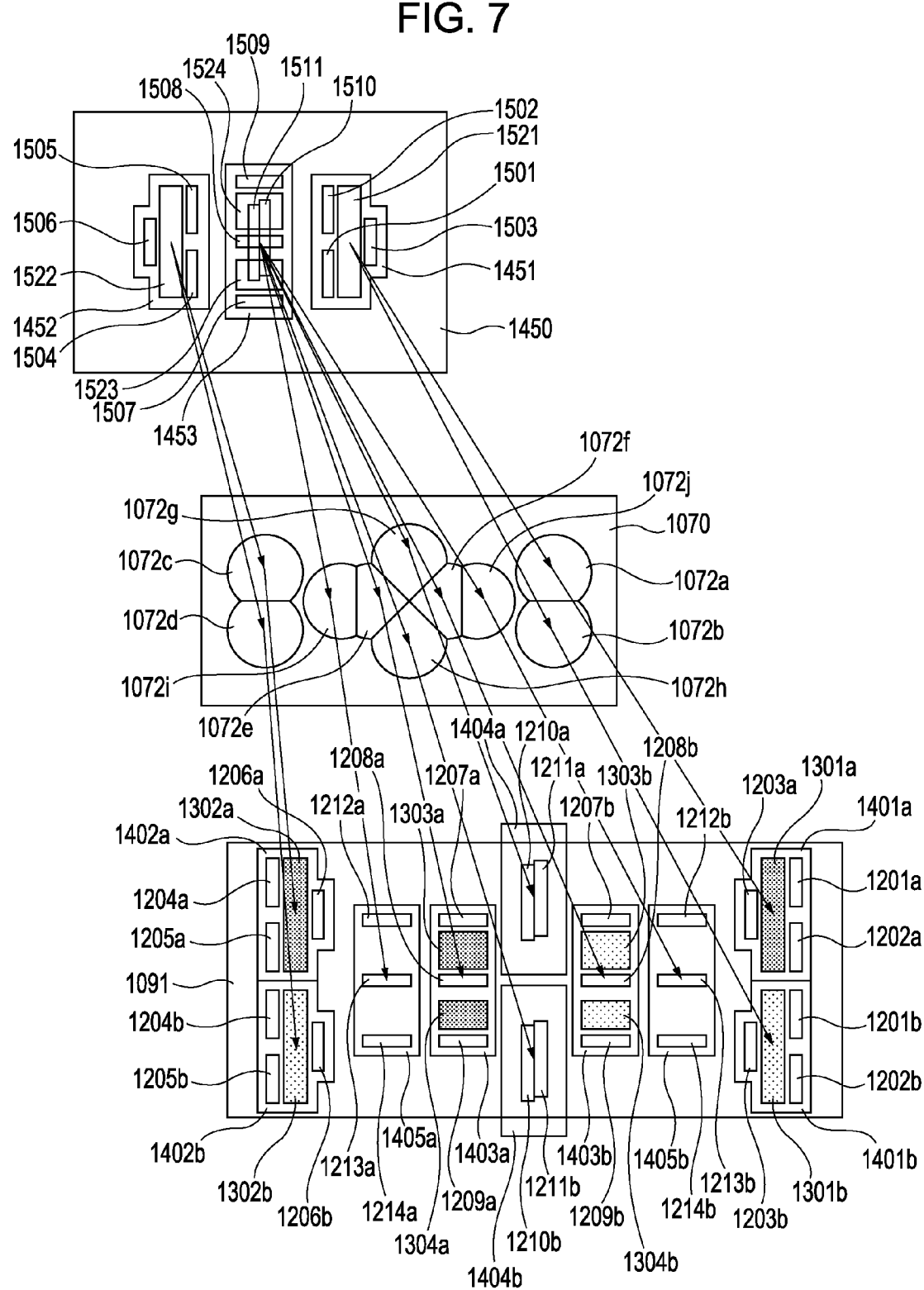
FIG. 7 is an explanatory view showing the relationship among a predetermined image plane of the image pickup apparatus, the image-reforming lens, the sensor, and images on the sensor by the image-reforming lens.

FIG. 5 shows a configuration of the sensor 1090 provided in the focus detecting device 109. FIG. 6 shows a configuration of the image-reforming lens 1070 provided in the focus detecting device 109. FIG. 7 shows the relationship among a predetermined image plane of the image pickup apparatus 100, the image-reforming lens 1070, the sensor 1090, and optical images formed on the sensor 1090 by the image-reforming lens 1070.

An imaging relationship in the focus detecting device 109 will be described below with reference to FIGS. 5, 6, and 7.

FIG. 7 schematically shows the field mask 1450 disposed near the predetermined image plane of the image pickup apparatus 100, the image-reforming lens 1070, and a sensor chip 1091 provided in the sensor 1090. Further, a reverse projection image of the sensor chip 1091 is schematically shown on the predetermined image plane of the image pickup apparatus 100.

The image-reforming lens 1070 includes image-reforming lens elements 1072a to 1072j. Line sensors 1201a to 1214a and 1201b to 1214b serving as focus detecting sensors and environment-detecting photoreceptors 1301a to 1304a and 1301b to 1304b serving as light-source detecting photoreceptors (also referred to as light metering sensors) are provided on the same substrate of the sensor chip 1091. The environment-detecting photoreceptors 1301a to 1304a and 1301b to 1304b are disposed so as to close gaps among the line sensors 1201a to 1214a and 1201b to 1214b.

Further, the environment-detecting photoreceptors 1301a to 1304a and 1301b to 1304b extend longer in the correlation direction of the line sensors (row direction of the line sensors) than in other directions. As shown in FIG. 7, the environment-detecting photoreceptors 1301a to 1304a and 1301b to 1304b are disposed so as to detect almost the same optical images as optical images detected by the line sensors 1201a to 1214a and 1201b to 1214b. Further, the line sensors 1021a to 1214a and 1201b to 1214b and the environment-detecting photoreceptors 1301a to 1304a and 1301b to 1304b are arranged so that optical images closer to the optical axis of the image-reforming lens, of optical images from the image pickup optical system, are detected by the line sensors, and so that optical images farther from the optical axis of the image-reforming lens than the optical images detected by the line sensors are received by the environment-detecting photoreceptors 1301a to 1304a and 1301b to 1304b. It is satisfactory as long as the spectral sensitivity characteristics of the light-source detecting photoreceptors are known. In this sense, the light-source detecting photoreceptors can be disposed farther from the optical axis than the focus detecting sensors.

Projection images 1401a to 1405a and 1401b to 1405b of field-mask apertures 1451 to 1453 of the field mask 1450 are formed on the sensor chip 1091 by the image-reforming lens elements 1072a to 1072h.

Reference numerals 1501 to 1511 denote reverse projection images formed when the line sensors 1201a to 1214a and 1201b to 1214b are reversely projected on the field mask 1450 by the image-reforming lens elements 1072a to 1072j. Reference numerals 1521 to 1524 denote reverse projection images formed when the environment-detecting photoreceptors 1301a to 1304a and 1301b to 1304b are reversely projected on the field mask 1450 by the image-reforming lens elements 1072a to 1072j.

A description will be given below of the relationship between the line sensors (focus detecting sensors) and the environment-detecting photoreceptors (light metering sensors).

Attention will be paid to the projection images 1401a and 1401b. The projection image 1401a is formed by projecting the field-mask aperture 1451 onto the sensor chip 1091 by the image-reforming lens element 1072a, and the projection image 1401b is formed by projecting the field-mask aperture 1451 onto the sensor chip 1091 by the image-reforming lens element 1072b.

The environment-detecting photoreceptor 1301a provided on the sensor chip 1091 is surrounded by the line sensors 1201a, 1202a, and 1203a grouped by the projection image 1401a that is formed on the sensor chip 1091 by the image-reforming lens element 1072a.

The environment-detecting photoreceptor 1301b provided on the sensor chip 1091 is surrounded by the line sensors 1201b, 1202b, and 1203b grouped by the projection image 1401b that is formed on the sensor chip 1091 by the image-reforming lens element 1072b.

On a predetermined image plane of the image pickup apparatus 100, the above-described projection images 1401a and 1401b define the same region shown by the field-mask aperture 1451, and are formed by light beams passing through different exit pupil areas of the image pickup optical system in the image pickup apparatus 100.

For this reason, the reverse projection images 1501, 1502, and 1503 are formed corresponding to the line sensors 1201a and 1201b, the line sensors 1202a and 1202b, and the line sensors 1203a and 1203b, respectively. By comparing the images detected by the line sensors, the focus adjustment state of the image pickup apparatus 100 is detected. The reverse projection image 1521 is formed corresponding to the environment-detecting photoreceptors 1301a and 1301b. Since the environment-detecting photoreceptors 1301a and 1301b have different spectral sensitivity characteristics, the environment characteristic of the detection region can be detected by comparing the outputs from the environment-detecting photoreceptors 1301a and 1301b.

Since the environment-detecting photoreceptor 1301a is disposed adjacent to the line sensors 1201a, 1202a, and 1203a and the environment-detecting photoreceptor 1301b is disposed adjacent to the line sensors 1201b, 1202b, and 1203b, the results of detection by the environment-detecting photoreceptors 1301a and 1301b can be applied to the results of focus detection by the line sensors 1201a, 1202a, and 1203a and the line sensors 1201b, 1202b, and 1203b.

Now the description is directed to the projection images 1402a and 1402b. The projection image 1402a is formed by projecting the field-mask aperture 1452 onto the sensor chip 1091 by the image-reforming lens element 1072c, and the projection image 1402b is formed by projecting the field-mask aperture 1452 onto the sensor chip 1091 by the image-reforming lens element 1072d.

The environment-detecting photoreceptor 1302a provided on the sensor chip 1091 is surrounded by the line sensors 1204a, 1205a, and 1206a grouped by the projection image 1402a that is formed on the sensor chip 1091 by the image-reforming lens element 1072c.

The environment-detecting photoreceptor 1302b provided on the sensor chip 1091 is surrounded by the line sensors 1204b, 1205b, and 1206b grouped by the projection image 1402b that is formed on the sensor chip 1091 by the image-reforming lens element 1072d.

On the predetermined image plane of the image pickup apparatus 100, the above-described projection images 1402a and 1402b define the same region shown by the field-mask aperture 1452, and are formed by light beams passing through different exit pupil areas of the image pickup optical system in the image pickup apparatus 100.

For this reason, the reverse projection images 1504, 1505, and 1506 are formed corresponding to the line sensors 1204a and 1204b, the line sensors 1205a and 1205b, and the line sensors 1206a and 1206b, respectively. By comparing the images detected by the line sensors, the focus adjustment state of the image pickup apparatus 100 is detected. The reverse projection image 1522 is formed corresponding to the environment-detecting photoreceptors 1302a and 1302b. Since the environment-detecting photoreceptors 1302a and 1302b have different spectral sensitivity characteristics, the environment characteristic of the detection region can be detected by comparing the outputs from the environment-detecting photoreceptors 1302a and 1302b.

Since the environment-detecting photoreceptor 1302a is disposed adjacent to the line sensors 1204a, 1205a, and 1206a and the environment-detecting photoreceptor 1302b is disposed adjacent to the line sensors 1204b, 1205b, and 1206b, the results of detection by the environment-detecting photoreceptors 1302a and 1302b can be applied to the results of focus detection by the line sensors 1204a, 1205a, and 1206a and the line sensors 1204b, 1205b, and 1206b.

Now attention is directed to the projection images 1403a and 1403b. The projection image 1403a is formed by projecting the field-mask aperture 1453 by the image-reforming lens element 1072e, and the projection image 1403b is formed by projecting the field-mask aperture 1453 by the image-reforming lens element 1072f.

The environment-detecting photoreceptors 1303a and 1304a are provided between the line sensors 1207a, 1208a, and 1209a grouped by the projection image 1403a that is formed on the sensor chip 1091 by the image-reforming lens element 1072e. In the first exemplary embodiment, the environment-detecting photoreceptor 1303a is provided between the line sensors 1207a and 1208a, and the environment-detecting photoreceptor 1304a is provided between the line sensors 1208a and 1209a.

The environment-detecting photoreceptors 1303b and 1304b are provided between the line sensors 1207b, 1208b, and 1209b grouped by the projection image 1403b that is formed on the sensor chip 1091 by the image-reforming lens element 1072f.

On the predetermined image plane of the image pickup apparatus 100, the above-described projection images 1403a and 1403b define the same region shown by the field-mask aperture 1453, and are formed by light beams passing through different exit pupil areas of the image pickup optical system in the image pickup apparatus 100.

For this reason, the reverse projection images 1507, 1508, and 1509 are formed corresponding to the line sensors 1207a and 1207b, the line sensors 1208a and 1208b, and the line sensors 1209a and 1209b, respectively. By comparing the images detected by the line sensors, the focus adjustment state of the image pickup apparatus 100 is detected. The reverse projection image 1508 lies on the image pickup optical axis of the image pickup apparatus 100, and the line sensors 1208a and 1208b detect the focus adjustment state on the image pickup optical axis.

The reverse projection images 1523 and 1524 are formed corresponding to the environment-detecting photoreceptors 1303a and 1303b and 1304a and 1304b, respectively. Since the environment-detecting photoreceptors 1303a and 1303b and 1304a and 1304b have different spectral sensitivity characteristics, the environment characteristic of the detection region can be detected by comparing the outputs from the environment-detecting photoreceptors 1303a and 1303b and 1304a and 1304b.

Two environment-detecting photoreceptors are provided in the region of each of the projection images 1403a and 1403b. A combination of the detection results of the two environment-detecting photoreceptors 1303a and 1304a and a combination of the detection results of the environment-detecting photoreceptors 1303b and 1304b can be applied to the results of focus detection by the line sensors 1207a, 1208a, and 1209a and the line sensors 1207b, 1208b, and 1209b. Further, the detection result of each environment-detecting photoreceptor can be applied to the result of focus detection by the adjacent line sensor.

Attention is now directed to the projection images 1404a and 1404b. The projection image 1404a is formed by projecting the field-mask aperture 1453 by the image-reforming lens element 1072g, and the projection image 1404b is formed by projecting the field-mask aperture 1453 by the image-reforming lens element 1072h.

The projection image 1404a formed on the sensor chip 1091 by the image-reforming lens element 1072g is detected only by the line sensors 1210a and 1211a. The projection image 1404b formed on the sensor chip 1091 by the image-reforming lens element 1072h is detected only by the line sensors 1210b and 1211b.

On the predetermined image plane of the image pickup apparatus 100, the above-described projection images 1404a and 1404b define the same region shown by the field-mask aperture 1453, and are formed by light beams passing through different exit pupil areas of the image pickup optical system in the image pickup apparatus 100.

For this reason, the reverse projection images 1510 and 1511 are formed corresponding to the line sensors 1210a and 1211a and the line sensors 1210b and 1211b, respectively. By comparing the images detected by the line sensors, the focus adjustment state of the image pickup apparatus 100 is detected.

While an environment-detecting photoreceptor is not provided in the regions of the projection images 1404a and 1404b in the first exemplary embodiment, the projection images 1404a and 1404b define the same region as the above-described projection images 1403a and 1403b on the predetermined image plane of the image pickup apparatus 100, and are formed by light beams passing through different exit pupil areas in the image pickup optical system of the image pickup apparatus 100. Therefore, as shown in FIG. 7, the reverse projection images 1510 and 1511 overlap with the reverse projection images 1508, 1523, and 1524.

For this reason, the results of detection by the environment-detecting photoreceptors 1303a and 1304a and the environment-detecting photoreceptors 1303b and 1304b can be applied to focus detection by the line sensors 1210a and 1211a and the line sensors 1210b and 1211b.

Attention is now directed to description of the projection images 1405a and 1405b. The projection image 1405a is formed by projecting the field-mask aperture 1453 by the image-reforming lens element 1072i, and the projection image 1405b is formed by projecting the field-mask aperture 1453 by the image-reforming lens element 1072j.

The projection image 1405a formed on the sensor chip 1091 by the image-reforming lens element 1072i is detected only by the line sensors 1212a, 1213a, and 1214a. The projection image 1405b formed on the sensor chip 1091 by the image-reforming lens element 1072j is detected only by the line sensors 1212b, 1213b, and 1214b.

On the predetermined image plane of the image pickup apparatus 100, the above-described projection images 1405a and 1405b define the same region shown by the field-mask aperture 1453, and are formed by light beams passing through different exit pupil areas of the image pickup optical system in the image pickup apparatus 100.

For this reason, the reverse projection images 1509, 1508 and 1507 are formed corresponding to the line sensors 1212a and 1212b, the line sensors 1213a and 1213b, and the line sensors 1214a and 1214b, respectively. By comparing the images detected by the line sensors, the focus adjustment state of the image pickup apparatus 100 is detected.

While an environment-detecting photoreceptor is not provided in the regions of the projection images 1405a and 1405b in the first exemplary embodiment, the projection images 1405a and 1405b define the same region as the above-described projection images 1403a and 1403b on the predetermined image plane of the image pickup apparatus 100. The projection images 1405a and 1405b are formed by light beams passing through different exit pupil areas of the image pickup system in the image pickup apparatus.

More specifically, the projection images 1405a and 1405b are different from the projection images 1403a and 1403b in base length for focus detection.

For this reason, the results of detection by the environment-detecting photoreceptors 1303a and 1303b and the environment-detecting photoreceptors 1304a and 1304b can be applied to the results of focus detection by the line sensors 1212a and 1212b, the line sensors 1213a and 1213b, and the line sensors 1214a and 1214b. As shown in FIG. 7, the base length in the projection images 1405a and 1405b is larger than that in the projection images 1403a and 1403b. The environment-detecting photoreceptors 1303a and 1303b and the environment-detecting photoreceptors 1304a and 1304b may be provided in the regions of the projection images 1405a and 1405b having the larger base length, instead of being provided in the regions of the projection images 1403a and 1403b having the smaller base length. However, this can apply only to a bright lens.

Figure 8:
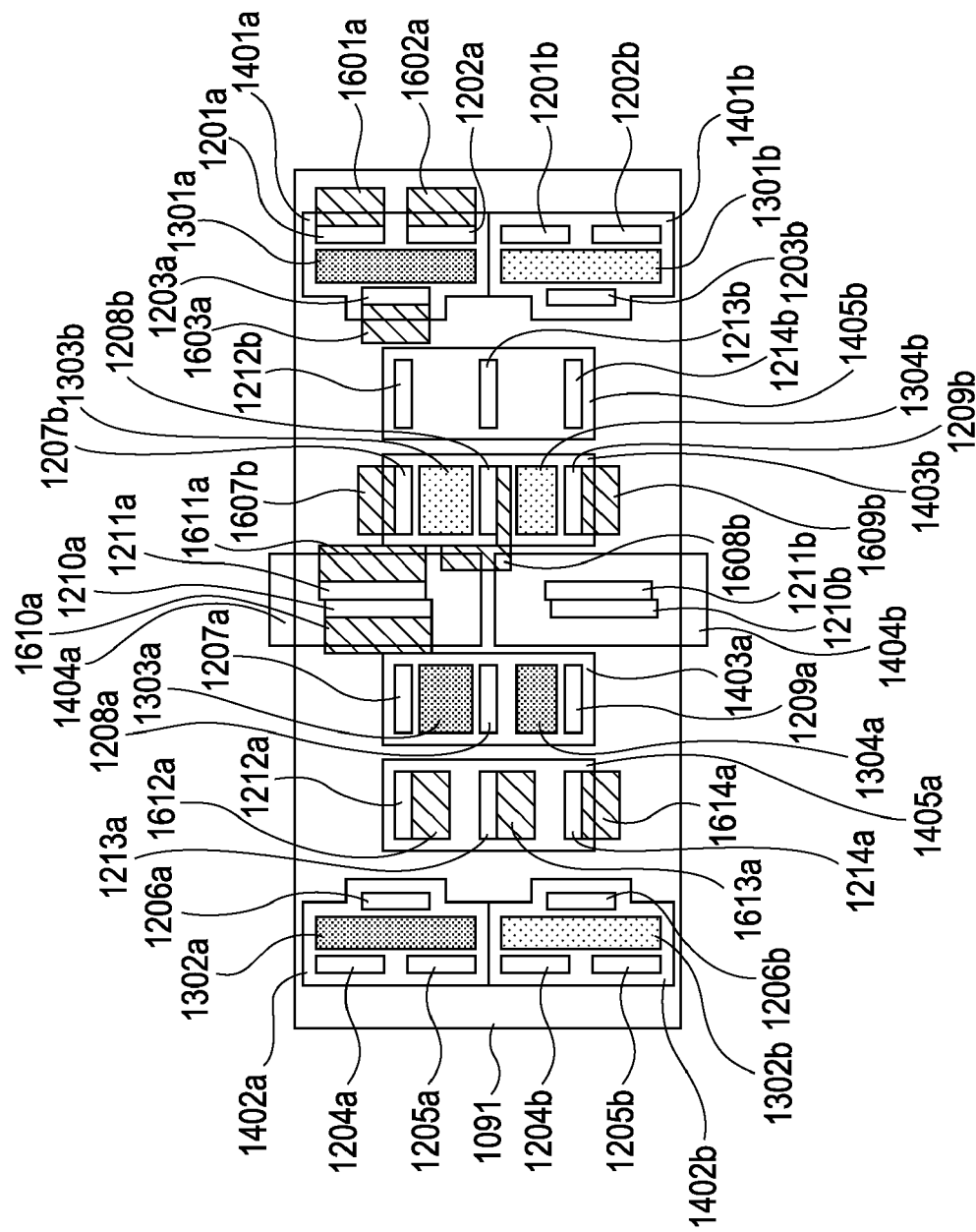
FIG. 8 is a schematic view showing some peripheral circuits in the sensor shown in FIG. 5.

FIG. 8 shows some peripheral circuits for the sensors shown in FIG. 5. Referring to FIG. 8, peripheral circuits 1601a, 1602a, and 1603a serving as line-sensor driving circuits are respectively added to the line sensors 1201a, 1202a, and 1203a grouped by the projection image 1401a. For example, each peripheral circuit includes a pixel amplifier, a memory, and a storage control circuit.

The peripheral circuits 1601a, 1602a, and 1603a are respectively disposed on the sides of the line sensors 1201a, 1202a, and 1203a opposite to the environment-detecting photoreceptor 1301a, and extend from the adjacencies of the line sensors to the outside of the projection image 1401a.

This arrangement increases the area of the environment-detecting photoreceptor 1301a disposed among the line sensors 1201a, 1202a, and 1203a.

Since the arrangements of the peripheral circuits for the projection images 1401b, 1402a, and 1402b are equivalent to the arrangement for the projection image 1401a, they are not shown in FIG. 8.

Peripheral circuits 1607b, 1608b, and 1609b serving as line-sensor driving circuits are respectively added to the line sensors 1207b, 1208b, and 1209b grouped by the projection image 1403b.

The peripheral circuit 1607b is disposed on the side of the line sensor 1207b opposite to the environment-detecting photoreceptor 1303b, and extends from the adjacency of the line sensor 1207b to the outside of the projection image 1403b. The peripheral circuit 1609b is disposed on the side of the line sensor 1209b opposite to the environment-detecting photoreceptor 1304b, and extends from the adjacency of the line sensor 1209b to the outside of the projection image 1403b. The minimum part of the peripheral circuit 1608b is disposed near the line sensor 1208b.

This arrangement increases the areas of the environment-detecting photoreceptors 1303b and 1304b provided between the line sensors 1207b, 1208b, and 1209b.

Since peripheral circuits for the projection image 1403a are arranged in a manner equivalent to that for the projection image 1403b, they are not shown in FIG. 8.

Peripheral circuits 1610a and 1611a serving as line-sensor driving circuits are respectively added to the line sensors 1210a and 1211a grouped by the projection image 1404a.

Since an environment-detecting photoreceptor is not provided in the projection image 1404a, the peripheral circuits 1610a and 1611a are disposed near the line sensors 1210a and 1211a.

Since peripheral circuits for the projection image 1404b are arranged in a manner equivalent to that for the projection image 1404a, they are not shown in FIG. 8.

Peripheral circuits 1612a, 1613a, and 1614a serving as line-sensor driving circuits are respectively added to the line sensors 1212a, 1213a, and 1214a grouped by the projection image 1405a.

Since an environment-detecting photoreceptor is not provided in the projection image 1405a, the peripheral circuits 1612a, 1613a, and 1614a are disposed near the line sensors 1212a, 1213a, and 1214a.

Since peripheral circuits for the projection image 1405b are arranged in a manner equivalent to that for the projection image 1405a, they are not shown in FIG. 8.

In the first exemplary embodiment, each environment-detecting photoreceptor is disposed between the line sensors, and a pair of environment-detecting photoreceptors are provided for each detection region on the predetermined image plane. Therefore, only four pairs of environment-detecting photoreceptors are provided for fourteen pairs of line sensors.

For this reason, when compared with the case in which an environment-detecting photoreceptor is provided for each line sensor, the area of the environment-detecting photoreceptor can be increased, and the number of driving circuits for the environment-detecting photoreceptors can be reduced. This reduces the driving power, and decreases the area of the sensor chip.

Figure 9:
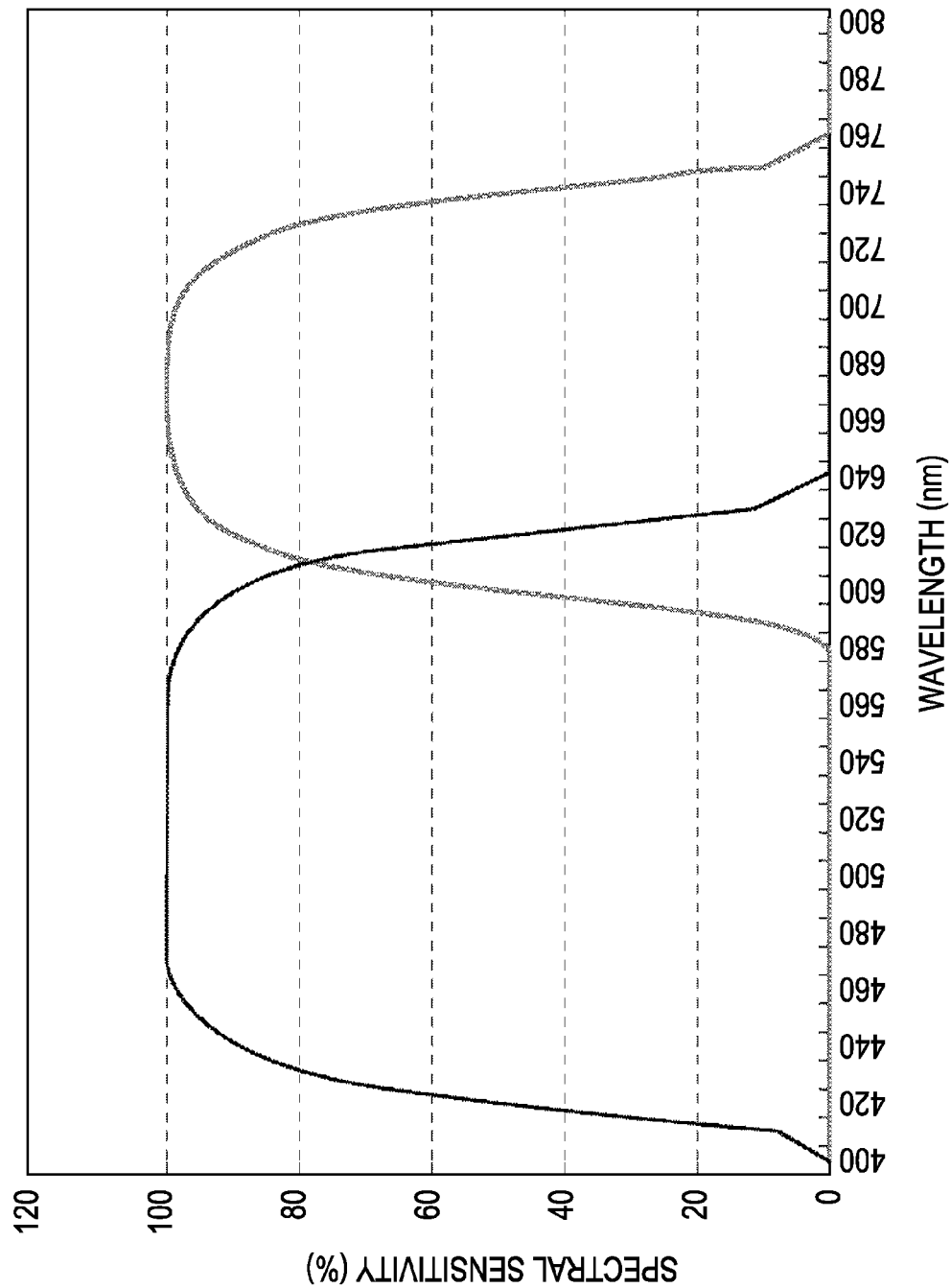
FIG. 9 is a graph showing examples of characteristics of environment-detecting photoreceptors provided in the sensor.
Figure 10:
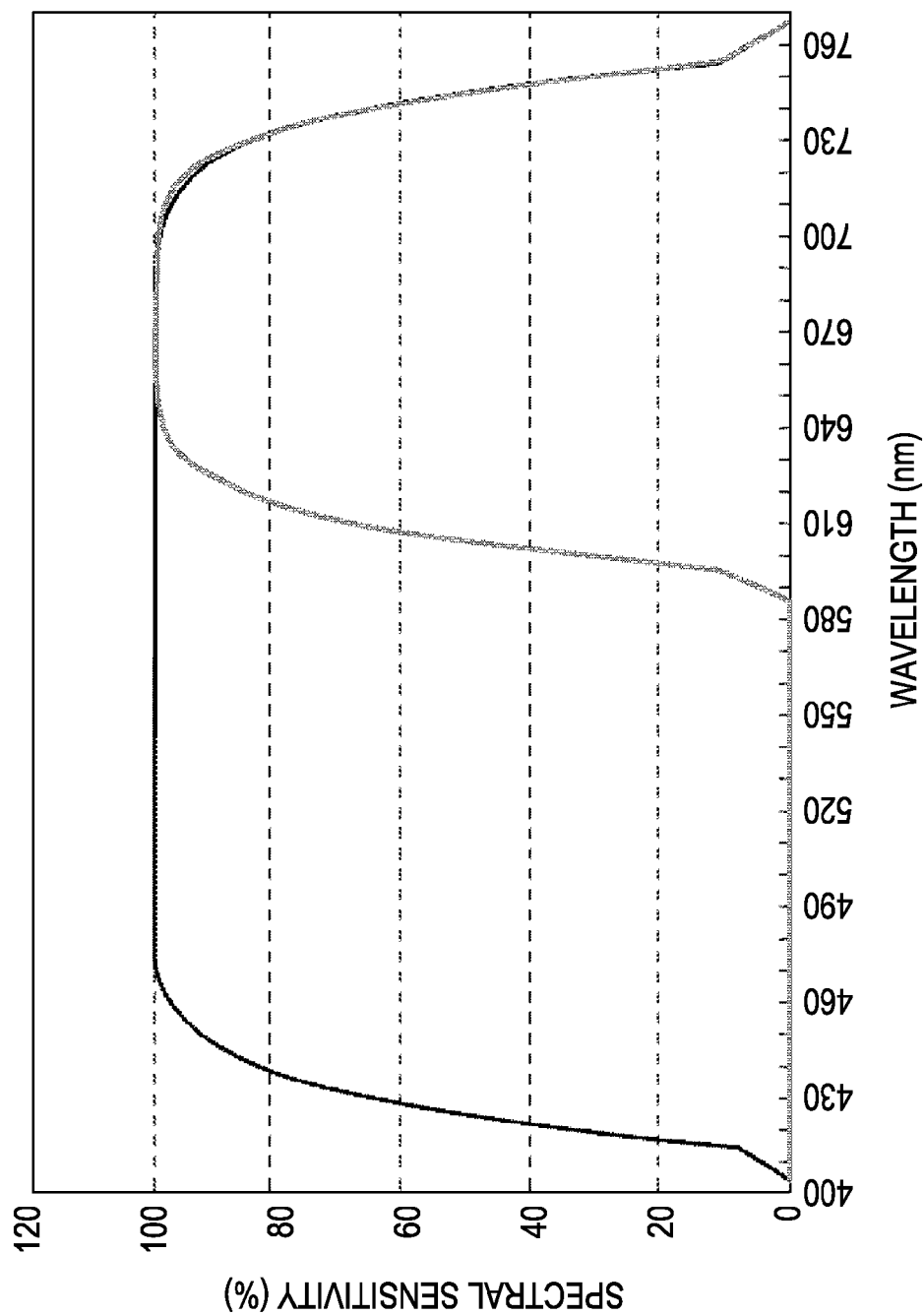
FIG. 10 is a graph showing other examples of characteristics of the environment-detecting photoreceptors.
Figure 11:
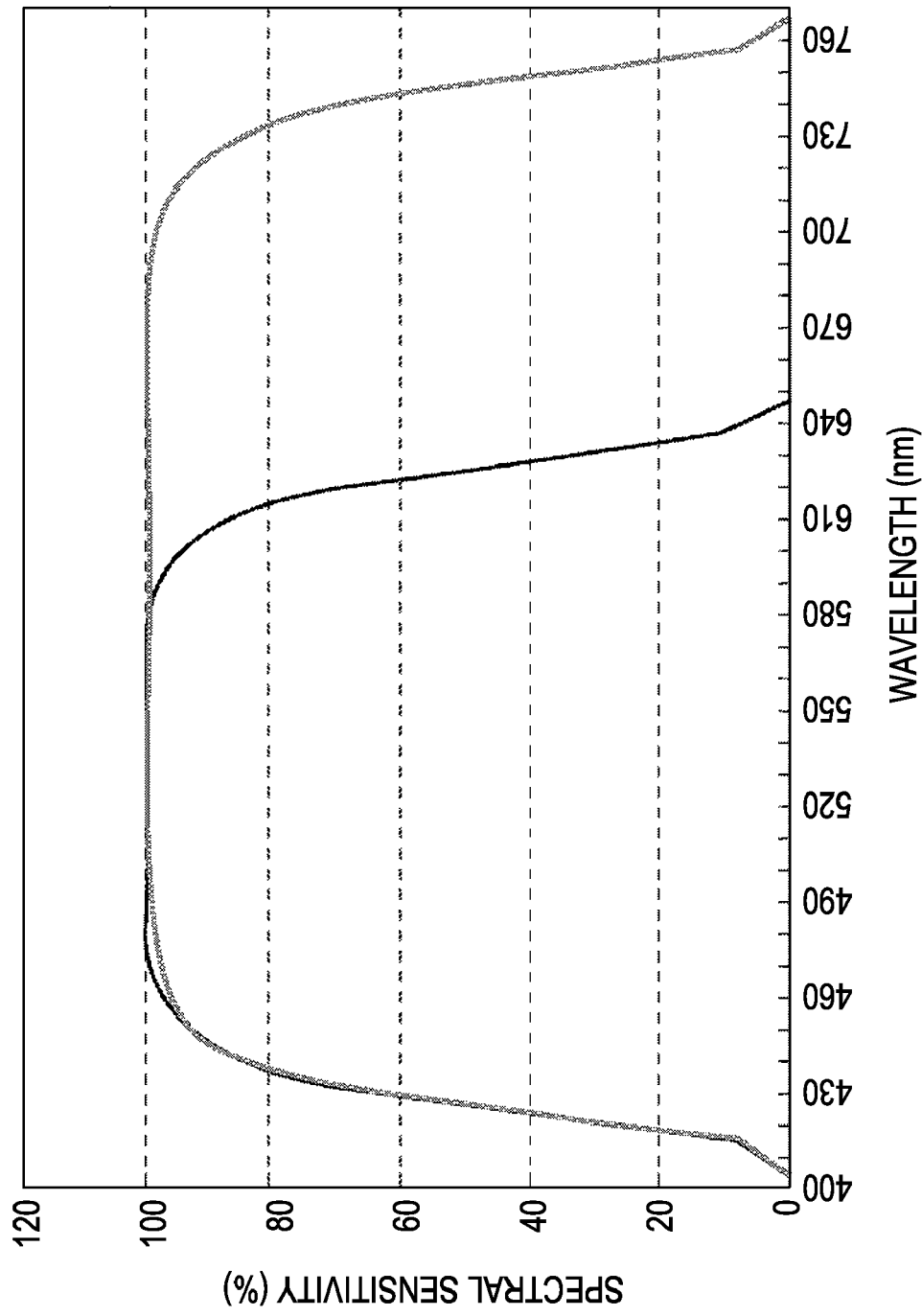
FIG. 11 is a graph showing further examples of characteristics of the environment-detecting photoreceptors.

FIGS. 9, 10, and 11 show examples of characteristics of the environment-detecting photoreceptors (light metering sensors) provided on the sensor chip 1091 in the first exemplary embodiment. Each of FIGS. 9, 10, and 11 shows two different spectral sensitivity characteristics as examples of sensor characteristics.

In FIG. 9, Characteristic 1 represents a characteristic of a first sensor having a spectral sensitivity in the visible region, and Characteristic 2 represents a characteristic of a second sensor having a spectral sensitivity in the infrared region. With these characteristics, the environment-detecting photoreceptors measure light beams having different wavelength regions.

When an output is obtained from only one of the first and second sensors in FIG. 9, only a light beam corresponding to the spectral sensitivity characteristic of the sensor from which the output is obtained is contained. The ratio of a visible light component and an infrared light component contained in the environment of the object field can be estimated from the ratio of the outputs from the first and second sensors.

In FIG. 10, Characteristic 1 represents a characteristic of a first sensor having a spectral sensitivity from the visible region to the infrared region, and Characteristic 2 represents a characteristic of a second sensor having a spectral sensitivity in the infrared region.

In FIG. 10, when an output is obtained only from the first sensor, an infrared light component is not contained. When outputs from the first and second sensors are the same, only an infrared light component is contained. The ratio of the visible light component and the infrared light component contained in the environment of the object field can be estimated from the ratio of the outputs from the first and second sensors.

In FIG. 11, Characteristic 1 represents a characteristic of a first sensor having a spectral sensitivity from the visible region to the infrared region, and Characteristic 2 represents a characteristic of a second sensor having a spectral sensitivity in the visible region.

In FIG. 11, when outputs from the first and second sensors are the same, an infrared light component is not contained. When an output is obtained only from the first sensor, only an infrared light component is contained. The ratio of the visible light component and the infrared light component contained in the environment of the object field can be estimated from the ratio of the outputs from the first and second sensors.

In the sensor having the spectral sensitivity in the visible region, when the spectral sensitivity is set to be equal to that of the image pickup element, the characteristic difference of the light source from the image pickup element can be detected.

The pair of environment-detecting photoreceptors 1301a and 1301b detect almost the same region on the predetermined image plane of the image pickup apparatus 100. This also applies to the pairs of environment-detecting photoreceptors 1302a and 1302b, 1303a and 1303b, and 1304a and 1304b.

For this reason, the environment-detecting photoreceptors 1301a to 1304a and the environment-detecting photoreceptors 1301b to 1304b are provided with different spectral sensitivity characteristics like Characteristics 1 and 2 shown in FIGS. 9, 10, and 11, and the outputs from the photoreceptors are compared. Consequently, the environment of the object field can be detected. A specific spectral sensitivity characteristic can be given to the environment-detecting photoreceptor by adding an optical filter to the photoreceptor. Alternatively, a specific wavelength can be extracted by using a sensor having a spectral sensitivity characteristic that varies in the sensor depth direction. A pair of sensors can have different specific characteristics when an optical filter is added to only one of the sensors.

It is noted that the characteristics shown in FIGS. 9, 10, and 11 are just exemplary, and the sensor characteristics are not limited thereto.

As described above, a smaller number of light-source detecting photoreceptors are arranged for a plurality of focus detecting sensors. This can increase the area of each light-source detecting photoreceptors, and can improve the low luminance limit for light-source detection.

A plurality of light-source photoreceptors are provided in the sensor chip 1091 near the focus detecting sensors so as to cope with a case in which different light sources (e.g., solar light and fluorescent light) are provided in the imaging screen. When the light-source detecting photoreceptors are disposed near the focus detecting sensors, they can receive almost the same light beam. Therefore, the light source for the light beam received by the focus detecting sensors can be detected. In other words, this arrangement allows a light-source detecting photoreceptor to be shared by a plurality of focus detecting sensors. Consequently, the area of the light-source detecting photoreceptor can be increased.

Second Exemplary Embodiment

A second exemplary embodiment of the present invention will be described below. Descriptions of the same components as those in the first exemplary embodiment are omitted.

Figure 12:
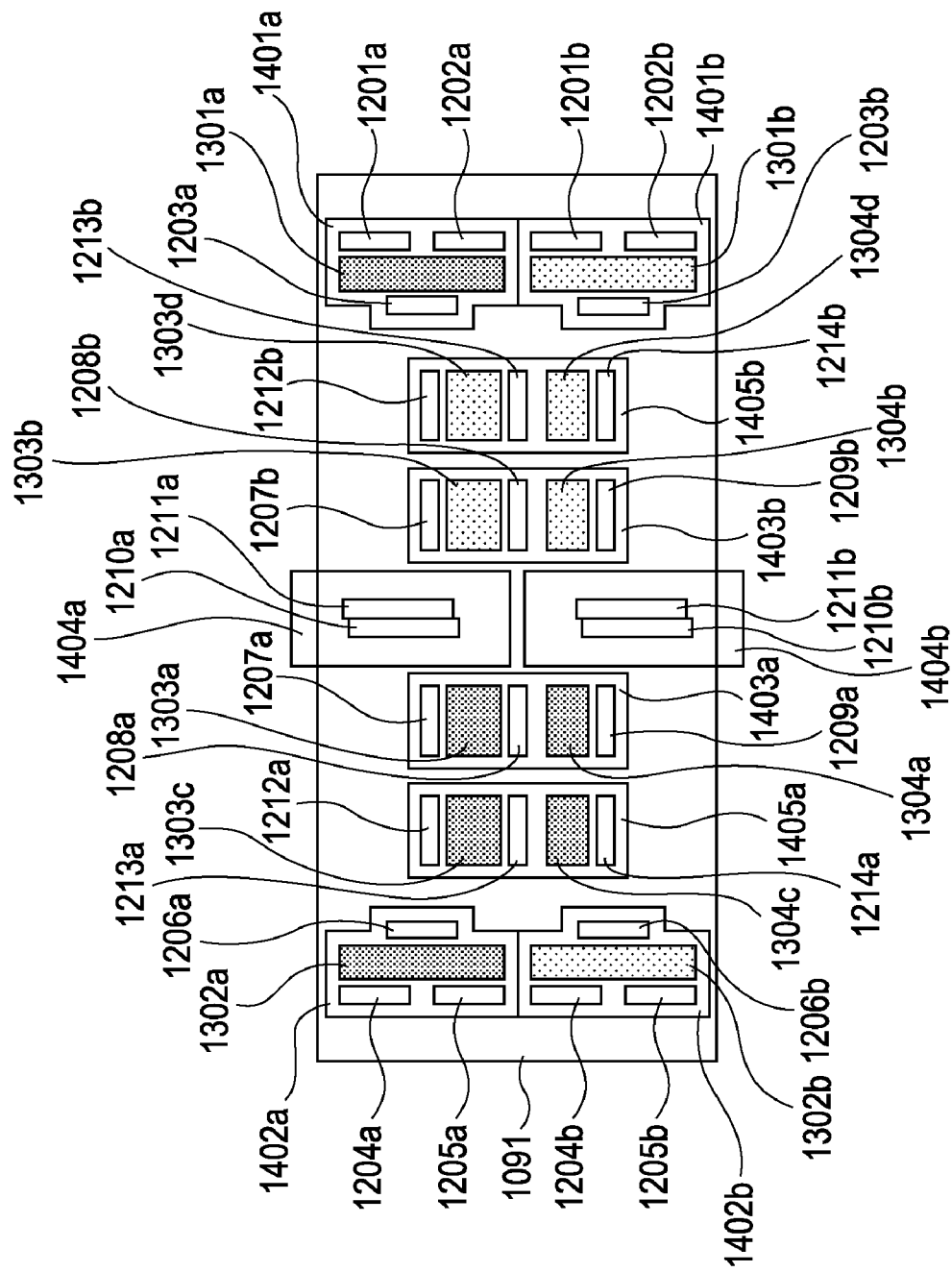
FIG. 12 is a schematic view showing a configuration of a sensor provided in a focus detecting device of an image pickup apparatus according to a second exemplary embodiment.

FIG. 12 shows an example configuration of a sensor 1090 provided in a focus detecting device 109 according to the second exemplary embodiment.

Figure 13:
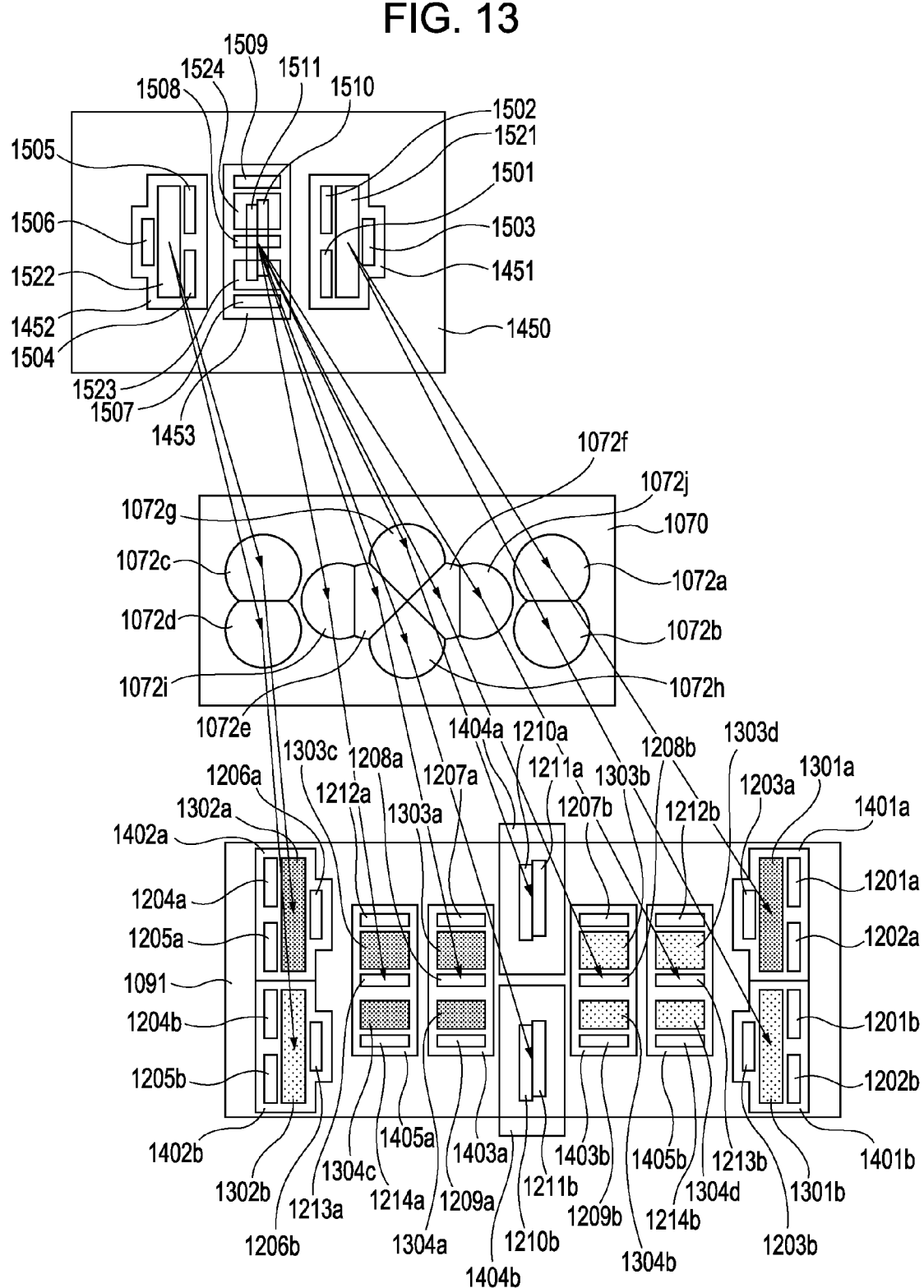
FIG. 13 is an explanatory view showing the relationship among a predetermined image plane of the image pickup apparatus, an image-reforming lens, the sensor, and images formed on the sensor by the image-reforming lens.

FIG. 13 shows the relationship among a predetermined image plane of an image pickup apparatus, an image-reforming lens 1070, the sensor 1090, and images formed by the image-reforming lens 10170 on the sensor 1090.

An imaging relationship of the focus detecting device 109 will be described below with reference to FIGS. 6, 12, and 13.

In FIG. 13, line sensors 1201a to 1212a and 1201b to 1212b, environment-detecting photoreceptors 1301a to 1304a and 1301b to 1304b, and projection images 1401a to 1404a and 1401b to 1404b formed by image-reforming lens elements 1072a to 1072h are the same as those shown in FIG. 5. Therefore, descriptions thereof are omitted.

Attention will be paid to projection images 1405a and 1405b. The projection image 1405a is formed by projecting a field-mask aperture 1453 by an image-reforming lens element 1072i, and the projection image 1405b is formed by projecting the field-mask aperture 1453 by an image-reforming lens element 1072j.

Environment-detecting photoreceptors 1303c and 1304c are disposed between line sensors 1212a, 1213a, and 1214a grouped by the projection image 1405a that is projected on the sensor chip 1091 by the image-reforming lens element 1072i. In the second exemplary embodiment, the environment-detecting photoreceptor 1303c is disposed between the line sensors 1212a and 1213a, and the environment-detecting photoreceptor 1304c is disposed between the line sensors 1213a and 1214a.

Environment-detecting photoreceptors 1303d and 1304d are disposed between the line sensors 1212b, 1213b, and 1214b grouped by the projection image 1405b that is projected on the sensor chip 1091 by the image-reforming lens element 1072j.

On the predetermined image plane of the image pickup apparatus, the projection images 1405a and 1405b define the same region shown by the field-mask aperture 1453, and are formed by light beams passing through different exit pupil areas of an image pickup optical system in the image pickup apparatus.

For this reason, reverse projection images 1507, 1508, and 1509 are formed corresponding to the line sensors 1212a and 1212b, the line sensors 1213a and 1213b, and the line sensors 1214a and 1214b, respectively. By comparing the images detected by the line sensors, the focus adjustment state of the image pickup apparatus is detected.

Reverse projection images 1523 and 1524 are formed corresponding to the environment-detecting photoreceptors 1303c and 1303d and the environment-detecting photoreceptors 1304c and 1304d, respectively. Since the environment-detecting photoreceptors 1303c and 1303d and the environment-detecting photoreceptors 1304c and 1304d have different spectral sensitivity characteristics, the environment characteristic of the detection region can be detected by comparing outputs from the environment-detecting photoreceptors.

In each of the projection images 1405a and 1405b, two environment-detecting photoreceptors are provided. A combination of the detection results of the two environment-detecting photoreceptors 1303c and 1304c and a combination of the detection results of the environment-detecting photoreceptors 1303d and 1304d can be applied to the results of focus detection by the line sensors 1212a and 1212b, the line sensors 1213a and 1213b, and the line sensors 1214a and 1214b. Alternatively, the detection result of each environment-detecting photoreceptor can be applied to the focus detection result of the adjacent line sensor.

On the predetermined image plane of the image pickup apparatus, the projection images 1405a and 1405b are almost the same regions as the projection images 1403a and 1403b. The environment-detecting photoreceptors 1303a to 1303d and 1304a to 1304d provided in the projection images are disposed in almost the same regions on the predetermined image plane of the image pickup apparatus.

For this reason, the environment-detecting photoreceptors 1303a to 1303d and the environment-detecting photoreceptors 1304a to 1304d are provided with different spectral sensitivity characteristics. The detection result obtained from outputs from the environment-detecting photoreceptors having four different spectral sensitivity characteristic can be applied to the focus detection results of the line sensor 1207a and 1207b, the line sensor 1208a and 1208b, the line sensors 1209a and 1209b, the line sensors 1212a and 1212b, the line sensors 1213a and 1213b, and the line sensors 1214a and 1214b.

Figure 14:
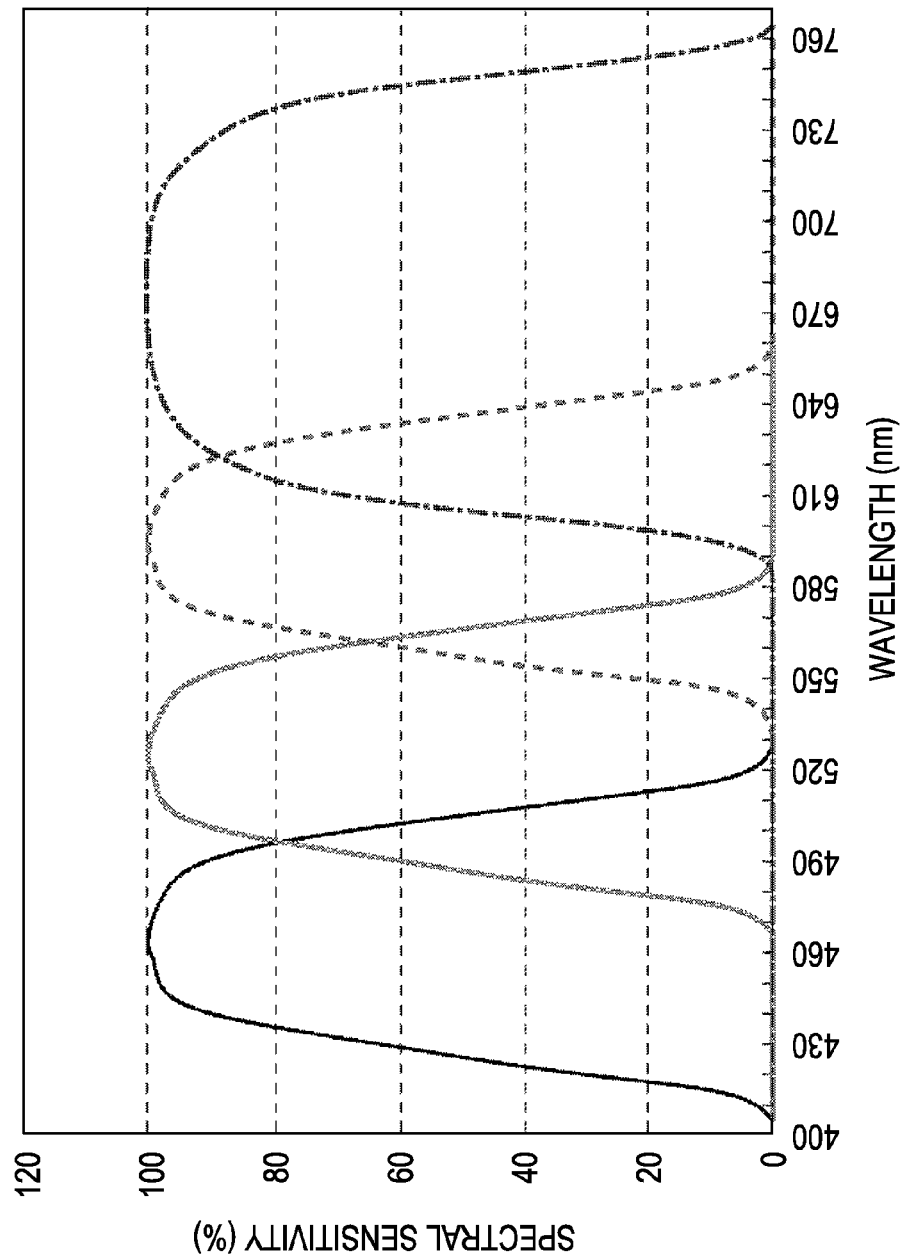
FIG. 14 is a graph showing examples of characteristics of environment-detecting photoreceptors provided in the sensor.

FIG. 14 shows examples of characteristics of the environment-detecting photoreceptors provided on the sensor chip 1091. And in particular, FIG. 14 shows four different spectral sensitivity characteristics as examples of sensor characteristics.

In FIG. 14, Characteristic 1 represents a characteristic of a first sensor having a spectral sensitivity in the visible blue region. Characteristic 2 represents a characteristic of a second sensor having a spectral sensitivity in the visible green region. Characteristic 3 represents a characteristic of a third sensor having a spectral sensitivity in the visible red region. Characteristic 4 represents a characteristic of a fourth sensor having a spectral sensitivity in the infrared region.

When an output is obtained only from any of the first to fourth sensors, only a component corresponding to the sensor that has the output is contained. When outputs are obtained from only from the first to third sensors, only a visible light component is contained. A detailed characteristic can be obtained from the ratio of the outputs from the first to third sensors.

In the second exemplary embodiment, the pair of environment-detecting photoreceptors 1301a and 1301b detect almost the same region on the predetermined image plane of the image pickup apparatus. This also applies to the pairs of environment-detecting photoreceptors 1302a and 1302b, 1303a and 1303b, 1304a and 1304b, 1303c and 1303d, and 1304c and 1304d.

For this reason, the environment-detecting photoreceptors 1301a, 1302a, 1303a, to 1304a and the environment-detecting photoreceptors 1301b, 1302b, 1303b, and 1304b are provided with different spectral sensitivity characteristics like Characteristics 1 and 2 shown in FIGS. 9, 10, and 11, and the outputs from the photoreceptors are compared, so that the environment of the object field can be detected.

Further, the four environment-detecting photoreceptors 1303a to 1303d detect almost the same region on the predetermined image plane of the image pickup apparatus, and the four environment-detecting photoreceptors 1304a to 1304d also detect almost the same region on the predetermined image plane.

For this reason, the environment-detecting photoreceptors 1303a to 1303d and the environment-detecting photoreceptors 1304a to 1304d are provided with different spectral sensitivity characteristics like Characteristics 1 to 4 shown in FIG. 14, and the outputs from the photoreceptors are compared, so that the environment of the object field can be detected.

The characteristics shown in FIG. 14 are just exemplary, and the sensor characteristics are not limited thereto.

As described above, each environment-detecting photoreceptor is provided between focus-detecting photoreceptors grouped by the image-reforming lens element. This can increase the area of the environment-detecting photoreceptor, and can improve the low luminance limit of the environment-detecting photoreceptor.

Third Exemplary Embodiment

A third exemplary embodiment of the present invention will be described below. Descriptions of the same components as those in the first exemplary embodiment are omitted.

Figure 15:
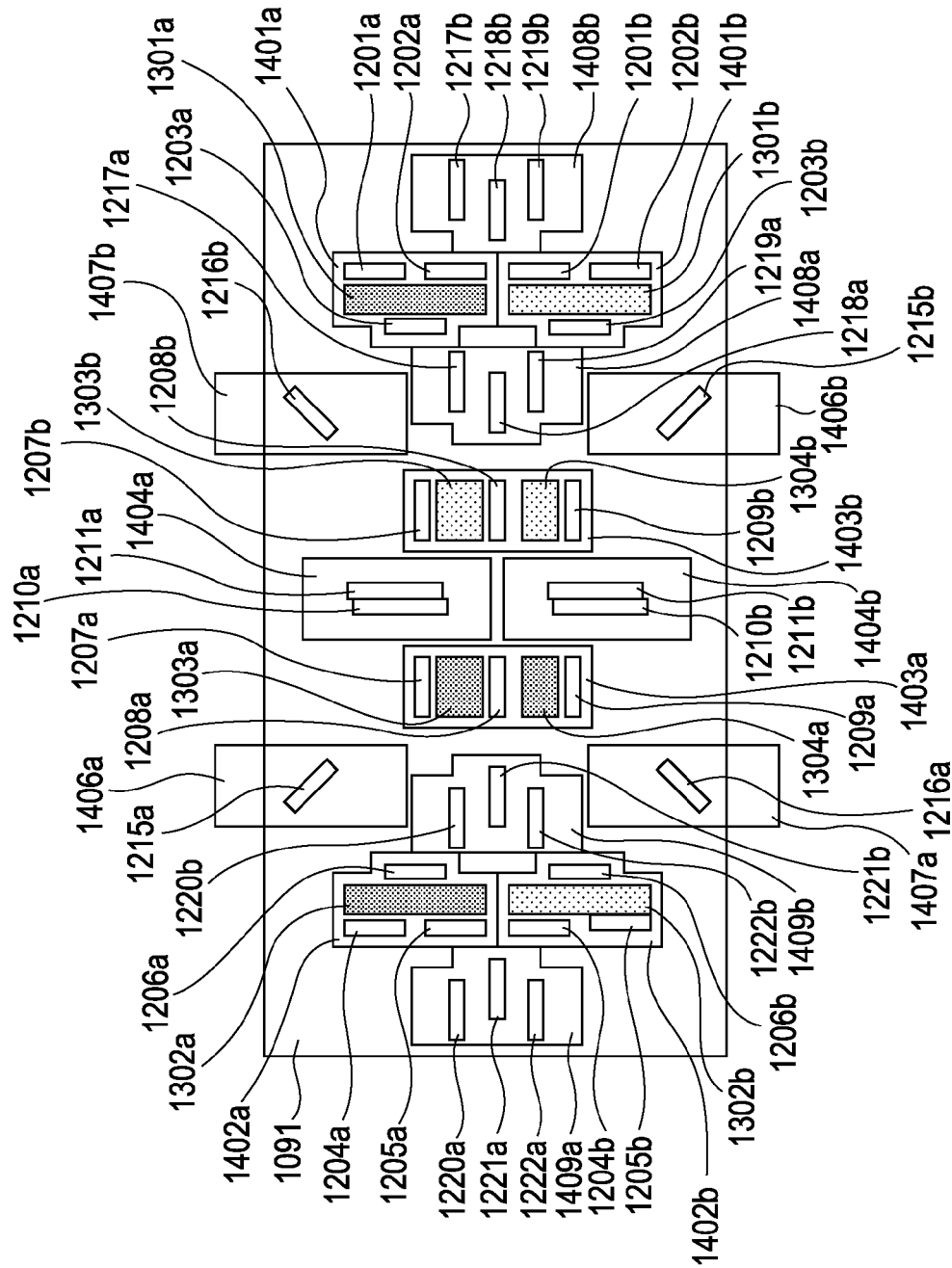
FIG. 15 is a schematic view showing an example configuration of a sensor provided in a focus detecting device of an image pickup apparatus according to a third exemplary embodiment.

FIG. 15 shows a configuration of a sensor 1090 provided in a focus detecting device 109 according to the third exemplary embodiment.

Figure 16:
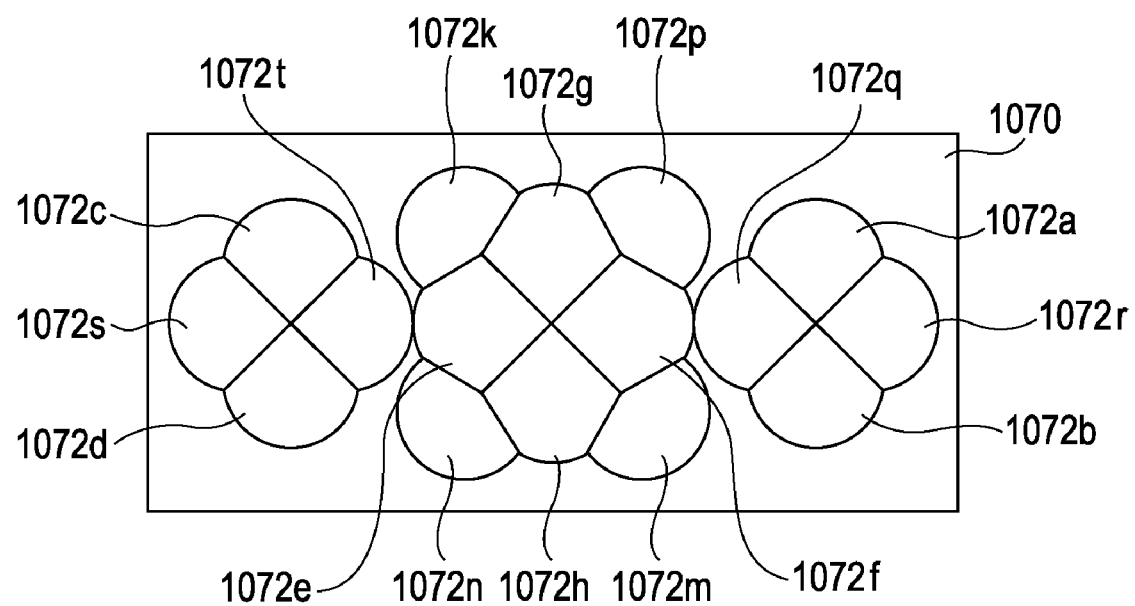
FIG. 16 is a schematic view of an example image-reforming lens provided in the focus detecting device.

FIG. 16 shows a configuration of an image-reforming lens 1070 provided in the focus detecting device 109.

Figure 17:
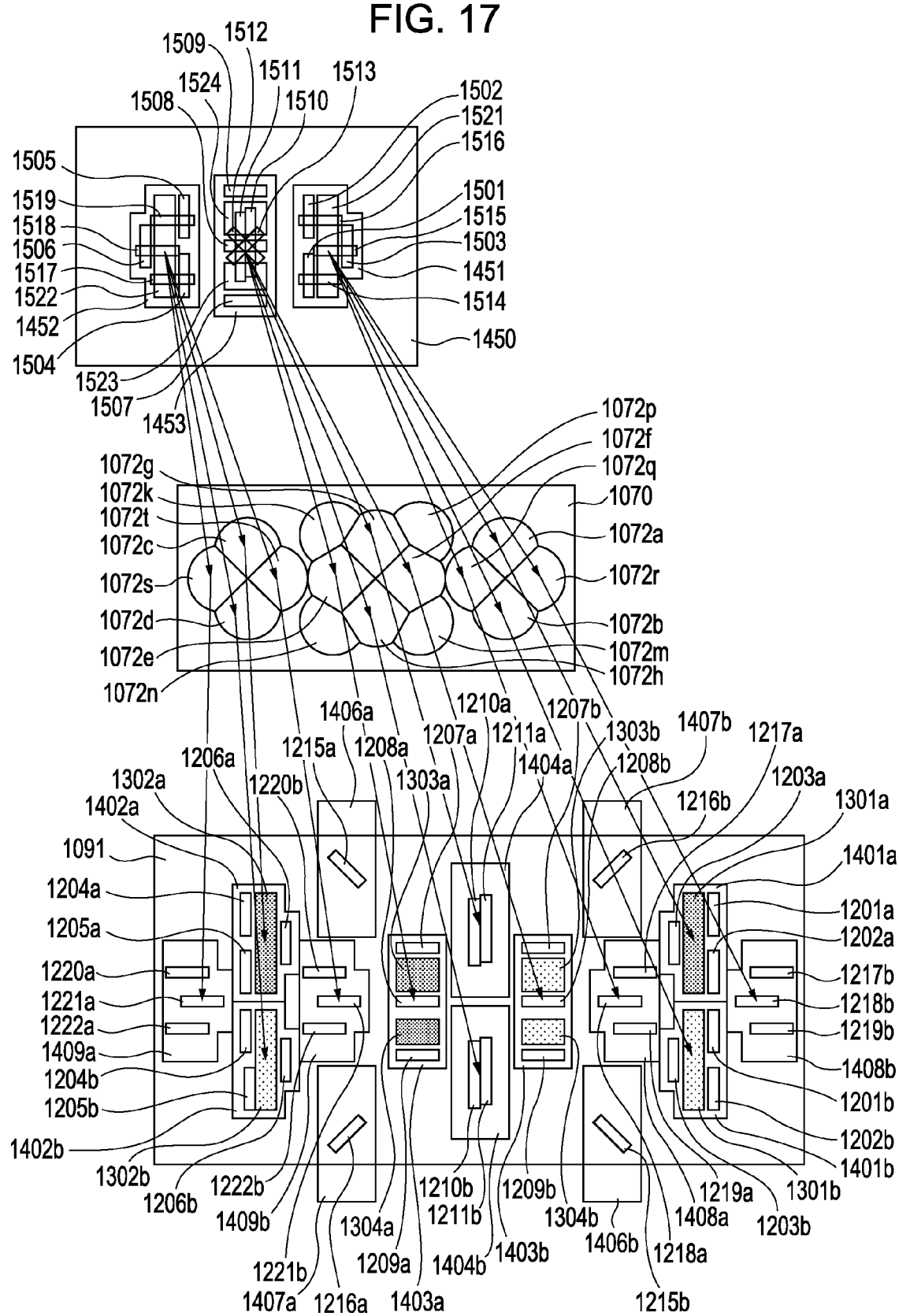
FIG. 17 is an explanatory view showing the relationship among a predetermined image plane of the image pickup apparatus, the image-reforming lens, the sensor, and images formed on the sensor by the image-reforming lens.
Figure 18:
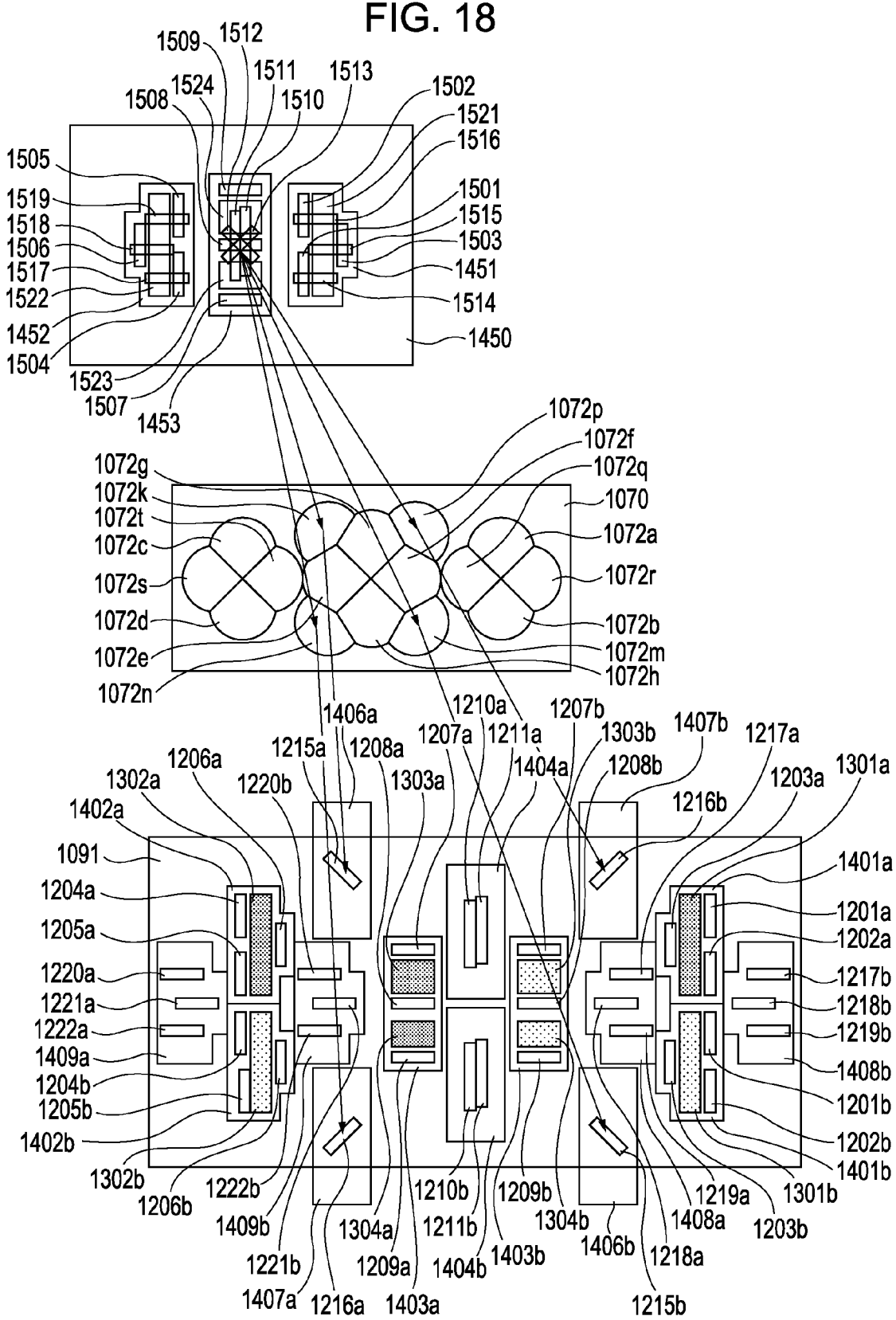
FIG. 18 is an explanatory view showing the relationship among the predetermined image plane of the image pickup apparatus, the image-reforming lens, the sensor, and the images formed on the sensor by the image-reforming lens.

FIGS. 17 and 18 show the relationship among a predetermined image plane of an image pickup apparatus according to this embodiment, the image-reforming lens 1070, the sensor 1090, and images formed on the sensor 1090 by the image-reforming lens 1070.

An imaging relationship of the focus detecting device 109 will be described below with reference to FIGS. 15, 16, 17, and 18.

FIGS. 17 and 18 schematically show a field mask 1450 disposed near a predetermined image plane of the image pickup apparatus, the image-reforming lens 1070, a sensor chip 1091 provided in the sensor 1090, and a reverse projection image 1500 of the sensor chip 1091 formed on the predetermined image plane.

The image-reforming lens 1070 includes image-reforming lens elements 1072a to 1072t. The sensor chip 1091 includes line sensors 1201a to 1222a and 1201b to 1222b, and environment-detecting photoreceptors 1301a to 1304a and 1301b to 1304b.

On the sensor chip 1091, projection images 1401a to 1409a and 1401b to 1409b of field-mask apertures 1451 to 1453 are formed by the image-reforming lens elements 1072a to 1072t.

Reverse projection images 1501 to 1519 are formed by reversely projecting the line sensors 1201a to 1222a and 1201b to 1222b onto the field mask 1450 by the image-reforming lens elements 1072a to 1072t. Reverse projection images 1521 to 1524 are formed by reversely projecting the environment-detecting photoreceptors 1301a to 1304a and 1301b to 1304b onto the field mask 1450 by the image-reforming lens elements 1072a to 1072t.

In FIGS. 17 and 18, the line sensors 1201a to 1211a and 1201b to 1211b, the environment-detecting photoreceptors 1301a to 1304a and 1301b to 1304b, and the projection images 1401a to 1404a and 1401b to 1404b formed by the image-reforming lens elements 1072a to 1072h are the same as those in FIG. 5. Therefore, descriptions thereof are omitted.

Description is now directed to the projection images 1406a and 1406b. The projection image 1406a is formed by projecting the field-mask aperture 1453 by the image-reforming lens element 1072k, and the projection image 1406b is formed by projecting the field-mask aperture 1453 by the image-reforming lens element 1072m.

The projection image 1406a projected on the sensor chip 1091 by the image-reforming lens element 1072k is detected only by the line sensor 1215a. The projection image 1406b projected on the sensor chip 1091 by the image-reforming lens element 1072m is detected only by the line sensor 1215b.

The projection images 1406a and 1406b define the same region shown by the field-mask aperture 1453 on the predetermined image plane of the image pickup apparatus, and are formed by light beams passing through different exit pupil areas in the image pickup optical system of the image pickup apparatus.

For this reason, a reverse projection image 1512 is formed by reversely projecting the line sensors 1215a and 1215b. The focus adjustment state of the image pickup apparatus is detected by comparing the images detected by the line sensors 1215a and 1215b.

While an environment-detecting photoreceptor is not provided in the regions of the projection images 1406a and 1406b in the third exemplary embodiment, the projection images 1406a and 1406b define the same region as the above-described projection images 1403a and 1403b on the predetermined image plane of the image pickup apparatus. The projection images 1406a and 1406b are formed by light beams passing through different exit pupil areas in the image pickup optical system of the image pickup apparatus.

For this reason, the results of detection by the environment-detecting photoreceptors 1303a and 1303b, and 1304a and 1304b can be applied to focus detection by the line sensors 1215a and 1215b.

Attention will be paid to the projection images 1407a and 1407b. The projection image 1407a is formed by projecting the field-mask aperture 1453 by the image-reforming lens element 1072n, and the projection image 1407b is formed by projecting the field-mask aperture 1453 by the image-reforming lens element 1072p.

The projection image 1407a projected on the sensor chip 1091 by the image-reforming lens element 1072n is detected only by the line sensor 1216a. The projection image 1407b projected on the sensor chip 1091 by the image-reforming lens element 1072p is detected only by the line sensor 1216b.

The projection images 1407a and 1407b define the same region shown by the field-mask aperture 1453 on the predetermined image plane of the image pickup apparatus, and are formed by light beams passing through different exit pupil areas in the image pickup optical system of the image pickup apparatus.

For this reason, the reverse projection image 1513 is formed corresponding to the line sensors 1216a and 1216b.

The focus adjustment state of the image pickup apparatus is detected by comparing the images detected by the line sensors 1216a and 1216b.

While an environment-detecting photoreceptor is not provided in the regions of the projection images 1407a and 1407b in the third exemplary embodiment, the projection images 1407a and 1407b are the same region as the above-described projection images 1403a and 1403b on the predetermined image plane of the image pickup apparatus. The projection images 1407a and 1407b are formed by light beams passing through different exit pupil areas in the image pickup optical system of the image pickup apparatus.

For this reason, the results of detection by the environment-detecting photoreceptors 1303a and 1303b, and 1304a and 1304b can be applied to focus detection by the line sensors 1216a and 1216b.

Attention will be paid to the projection images 1408a and 1408b. The projection image 1408a is formed by projecting the field-mask aperture 1451 by the image-reforming lens element 1072q, and the projection image 1408b is formed by projecting the field-mask aperture 1451 formed by the image-reforming lens element 1072r.

The projection image 1408a projected on the sensor chip 1091 by the image-reforming lens element 1072q is detected only by the line sensors 1217a, 1218a, and 1219a. The projection image 1408b projected on the sensor chip 1091 by the image-reforming lens 1072r is detected only by the line sensors 1217b, 1218b, and 1219b.

The projection images 1408a and 1408b define the same region shown by the field-mask aperture 1451 on the predetermined image plane of the image pickup apparatus, and are formed by light beams passing through different exit pupil areas in the image pickup optical system of the image pickup apparatus.

For this reason, the reverse projection images 1514, 1515, and 1516 are formed corresponding to the line sensors 1217a and 1217b, the line sensors 1218a and 1218b, and the line sensors 1219a and 1219b, respectively. The focus adjustment state of the image pickup apparatus is detected by comparing the images detected by the line sensors 1217a and 1217b, the line sensors 1218a and 1218b, and the line sensors 1219a and 1219b.

While an environment-detecting photoreceptor is not provided in the regions of the projection images 1408a and 1408b in the third exemplary embodiment, the projection images 1408a and 1408b are the same region as the above-described projection images 1401a and 1401b on the predetermined image plane of the image pickup apparatus. The projection images 1408a and 1408b are formed by light beams passing through different exit pupil areas in the image pickup optical system of the image pickup apparatus.

For this reason, the results of detection by the environment-detecting photoreceptors 1301a and 1301b can be applied to focus detection by the line sensors 1217a and 1217b, the line sensors 1218a and 1218b, and the line sensors 1219a and 1219b.

Attention is now directed to the projection images 1409a and 1409b. The projection image 1409a is formed by projecting the field-mask aperture 1452 the image-reforming lens element 1072s, and the projection image 1409b is formed by projecting the field-mask aperture 1452 formed by the image-reforming lens element 1072t.

The projection image 1409a projected on the sensor chip 1091 by the image-reforming lens element 1072s is detected only by the line sensors 1220a, 1221a, and 1222a. The projection image 1409b projected on the sensor chip 1091 by the image-reforming lens 1072*t* is detected only by the line sensors 1220*b*, 1221*b*, and 1222*b*.

The projection images 1409*a* and 1409*b* define the same region shown by the field-mask aperture 1452 on the predetermined image plane of the image pickup apparatus, and are formed by light beams passing through different exit pupil areas in the image pickup optical system of the image pickup apparatus.

For this reason, the reverse projection images 1517, 1518, and 1519 are formed corresponding to the line sensors 1220*a* and 1220*b*, the line sensors 1221*a* and 1221*b*, and the line sensors 1222*a* and 1222*b*, respectively. The focus adjustment state of the image pickup apparatus is detected by comparing the images detected by the line sensors 1220*a* and 1220*b*, the line sensors 1221*a* and 1221*b*, and the line sensors 1222*a* and 1222*b*.

While an environment-detecting photoreceptor is not provided in the regions of the projection images 1409*a* and 1409*b* in the third exemplary embodiment, the projection images 1409*a* and 1409*b* are the same region as the above-described projection images 1402*a* and 1402*b* on the predetermined image plane of the image pickup apparatus. The projection images 1409*a* and 1409*b* are formed by light beams passing through different exit pupil areas in the image pickup optical system of the image pickup apparatus.

For this reason, the result of detection by the environment-detecting photoreceptors 1302*a* and 1302*b* can be applied to focus detection by the line sensors 1220*a* and 1220*b*, the line sensors 1221*a* and 1221*b*, and the line sensors 1222*a* and 1222*b*.

In the third exemplary embodiment, the characteristics shown in FIGS. 9, 10, and 11 can be adopted similarly to the first exemplary embodiment.

As described above, a smaller number of light-source detecting photoreceptors are appropriately positioned relative to a plurality of focus-detecting sensors. This can increase the area of each light-source detecting photoreceptor. This increase of the area can improve the low luminance limit for light source detection. Moreover, since the environment-detecting photoreceptors 1301*a* to 1304*a* and 1301*b* to 1304*b* serving as the light-source detecting photoreceptors are disposed near the focus detection regions, focus detection can be corrected precisely.

In the above-described exemplary embodiments, the focus-detecting sensors and the environment-detecting photoreceptors are provided on the same sensor chip. Even when the focus-detecting sensors and the environment-detecting photoreceptors are provided in different sensors, the arrangement described in the above embodiments allows light source and focus detection to be efficiently performed while increasing the area of the light-source detecting photoreceptors. Further, in the above-described exemplary embodiments, the environment-detecting photoreceptors serving as the light metering sensors are provided in pairs. The environment characteristic of the detection region can be detected by comparing the outputs from the pair of environment-detecting photoreceptors. Alternatively, a plurality of wavelength components of the received light can be detected with one light metering sensor so as to detect the environment characteristic of the detection region. In this case, light source and focus detection can also be efficiently performed while increasing the area of the light-metering sensors by placing the light metering sensors between the focus-detecting sensors.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-310381 filed Nov. 16, 2006, which is hereby incorporated by reference herein in its entirety.

What is claimed is:

1. A photosensor comprising:
a first focus-detecting sensor and a second focus-detecting sensor configured to receive a light beam from an object so as to detect a first defocus amount of an imaging optical system from a pair of received optical images;
a third focus-detecting sensor and a fourth focus-detecting sensor configured to receive the light beam from the object so as to detect a second defocus amount of the imaging optical system from the pair of received optical images;
a first light detection sensor configured to detect a wavelength component of the light beam for detecting a light source that originates the light beam received by the first and second focus-detecting sensors or received by the third and fourth focus-detecting sensors; and
a second light detection sensor different from the first light detection sensor,
wherein the first light detection sensor is disposed between the first and third focus-detecting sensors or between the second and fourth focus-detecting sensors,
wherein the second light detection sensor is disposed between the first and third focus-detecting sensors or between the second and fourth focus-detecting sensors in a position different from where the first light detection sensor is disposed, and
wherein at least one of the first and second light detection sensors is provided with an optical filter having a predetermined spectral sensitivity characteristic.

2. A photosensor comprising:
a first focus-detecting sensor and a second focus-detecting sensor configured to receive a light beam from an object so as to detect a first defocus amount of an imaging optical system from a pair of received optical images;
a third focus-detecting sensor and a fourth focus-detecting sensor configured to receive the light beam from the object so as to detect a second defocus amount of the imaging optical system from the pair of received optical images;
a first light detection sensor configured to detect a wavelength component of the light beam for detecting a light source that originates the light beam received by the first and second focus-detecting sensors or received by the third and fourth focus-detecting sensors; and
a second light detection sensor different from the first light detection sensor,
wherein the first light detection sensor is disposed between the first and third focus-detecting sensors or between the second and fourth focus-detecting sensors,
wherein the second light detection sensor is disposed between the first and third focus-detecting sensors or between the second and fourth focus-detecting sensors in a position different from where the first light detection sensor is disposed, and
wherein a spectral sensitivity characteristic of one of the first and second light detection sensors has a higher spectral sensitivity in an infrared light region than the other light detection sensor.

3. A photosensor comprising:
a first focus-detecting sensor and a second focus-detecting sensor configured to receive a light beam from an object so as to detect a first defocus amount of an imaging optical system from a pair of received optical images;
a third focus-detecting sensor and a fourth focus-detecting sensor configured to receive the light beam from the object so as to detect a second defocus amount of the imaging optical system from the pair of received optical images;
a first light detection sensor configured to detect a wavelength component of the light beam for detecting a light source that originates the light beam received by the first and second focus-detecting sensors or received by the third and fourth focus-detecting sensors;
a second light detection sensor different from the first light detection sensor, and
a field lens through which the pair of optical images is projected,
wherein the first light detection sensor is disposed between the first and third focus-detecting sensors or between the second and fourth focus-detecting sensors,
wherein the second light detection sensor is disposed between the first and third focus-detecting sensors or between the second and fourth focus-detecting sensors in a position different from where the first light detection sensor is disposed, and
wherein the first and second light detection sensors detect the pair of optical images passing through the same field lens as for the first to fourth focus-detecting sensors.

4. A photosensor comprising:
a first focus-detecting sensor and a second focus-detecting sensor configured to receive a light beam from an object so as to detect a first defocus amount of an imaging optical system from a pair of received optical images;
a third focus-detecting sensor and a fourth focus-detecting sensor configured to receive the light beam from the object so as to detect a second defocus amount of the imaging optical system from the pair of received optical images;
a first light detection sensor configured to detect a wavelength component of the light beam for detecting a light source that originates the light beam received by the first and second focus-detecting sensors or received by the third and fourth focus-detecting sensors; and
a second light detection sensor different from the first light detection sensor,
wherein the first light detection sensor is disposed between the first and third focus-detecting sensors or between the second and fourth focus-detecting sensors,
wherein the second light detection sensor is disposed between the first and third focus-detecting sensors or between the second and fourth focus-detecting sensors in a position different from where the first light detection sensor is disposed, and
wherein the first to fourth focus-detecting sensors detect an optical image close to the optical axis of the imaging optical system, and the first and second light detection sensors detect an optical image apart from the optical axis of the imaging optical system.

5. A photosensor comprising:
a first focus-detecting sensor and a second focus-detecting sensor configured to receive a light beam from an object so as to detect a first defocus amount of an imaging optical system from a pair of received optical images;
a third focus-detecting sensor and a fourth focus-detecting sensor configured to receive the light beam from the object so as to detect a second defocus amount of the imaging optical system from the pair of received optical images;
a first light detection sensor configured to detect a wavelength component of the light beam for detecting a light source that originates the light beam received by the first and second focus-detecting sensors or received by the third and fourth focus-detecting sensors;
a second light detection sensor different from the first light detection sensor; and
a pair of fifth and sixth focus-detecting sensors configured to detect the same region of an optical image formed on a predetermined image plane by the imaging optical system as that of the first and second focus-detecting sensors with a different base length,
wherein the first light detection sensor is disposed between the first and third focus-detecting sensors or between the second and fourth focus-detecting sensors,
wherein the second light detection sensor is disposed between the first and third focus-detecting sensors or between the second and fourth focus-detecting sensors in a position different from where the first light detection sensor is disposed, and
wherein the first and second light detection sensors are disposed so as to detect an optical image having a base length of the first and third focus-detecting sensors or the fifth and sixth focus-detecting sensors.

6. The photosensor according to claim 5, wherein a base length of the first and second light detection sensors is shorter than the base length of the fifth and sixth focus- detecting sensors.

7. The photosensor according to claim 5, further comprising seventh and eighth focus-detecting sensors configured to receive the light beam from the object so as to detect a third defocus amount of the imaging optical system from a pair of received images,
wherein at least one of the first to fourth focus-detecting sensors and at least one of the seventh and eighth focus-detecting sensors are disposed so that optical images thereof formed on a predetermined image plane overlap with each other.

8. A photosensor comprising:
a first focus-detecting sensor and a second focus-detecting sensor configured to receive a light beam from an object so as to detect a first defocus amount of an imaging optical system from a pair of received optical images;
a third focus-detecting sensor and a fourth focus-detecting sensor configured to receive the light beam from the object so as to detect a second defocus amount of the imaging optical system from the pair of received optical images;
a first light detection sensor configured to detect a wavelength component of the light beam for detecting a light source that originates the light beam received by the first and second focus-detecting sensors or received by the third and fourth focus-detecting sensors; and
a second light detection sensor different from the first light detection sensor,
wherein the first light detection sensor is disposed between the first and third focus-detecting sensors or between the second and fourth focus-detecting sensors,
wherein the second light detection sensor is disposed between the first and third focus-detecting sensors or between the second and fourth focus-detecting sensors in a position different from where the first light detection sensor is disposed, and wherein the area of light-receiving portions of the first and second light detection sensors is larger than that of the first to fourth focus-detecting sensors.

9. A photosensor comprising:
a first focus-detecting sensor and a second focus-detecting sensor configured to receive a light beam from an object so as to detect a first defocus amount of an imaging optical system from a pair of received optical images;
a third focus-detecting sensor and a fourth focus-detecting sensor configured to receive the light beam from the object so as to detect a second defocus amount of the imaging optical system from the pair of received optical images;
a first light detection sensor configured to detect a wavelength component of the light beam for detecting a light source that originates the light beam received by the first and second focus-detecting sensors or received by the third and fourth focus-detecting sensors; and
a second light detection sensor different from the first light detection sensor,
wherein the first light detection sensor is disposed between the first and third focus-detecting sensors or between the second and fourth focus-detecting sensors,
wherein the second light detection sensor is disposed between the first and third focus-detecting sensors or between the second and fourth focus-detecting sensors in a position different from where the first light detection sensor is disposed, and
wherein the first and second light detection sensors extend long in a correlation direction of light-receiving portions of the first to fourth focus-detecting sensors.

10. A photosensor comprising:
a first focus-detecting sensor and a second focus-detecting sensor configured to receive a light beam from an object so as to detect a first defocus amount of an imaging optical system from a pair of received optical images;
a third focus-detecting sensor and a fourth focus-detecting sensor configured to receive the light beam from the object so as to detect a second defocus amount of the imaging optical system from the pair of received optical images;
a first light detection sensor configured to detect a wavelength component of the light beam for detecting a light source that originates the light beam received by the first and second focus-detecting sensors or received by the third and fourth focus-detecting sensors; and
a second light detection sensor different from the first light detection sensor,
wherein the first light detection sensor is disposed between the first and third focus-detecting sensors or between the second and fourth focus-detecting sensors,
wherein the second light detection sensor is disposed between the first and third focus-detecting sensors or between the second and fourth focus-detecting sensors in a position different from where the first light detection sensor is disposed,
wherein at least one of the peripheral circuits for the first to fourth focus-detecting sensors is disposed on a side of the focus-detecting sensor opposite to the adjacent first or second light detection sensor, and
wherein at least one of the peripheral circuits for the first to fourth focus-detecting sensors provided in the same light-receiving area is disposed on a side of the focus-detecting sensor opposite to the first light detection sensor.

11. The photosensor according to claim 10, wherein said at least one of the peripheral circuits includes at least one of a pixel amplifier and a memory.

12. A focus detecting device comprising:
a photosensor including,
a first focus-detecting sensor and a second focus-detecting sensor configured to receive a light beam from an object so as to detect a first defocus amount of an imaging optical system from a pair of received optical images;
a third focus-detecting sensor and a fourth focus-detecting sensor configured to receive the light beam from the object so as to detect a second defocus amount of the imaging optical system from the pair of received optical images;
a first light detection sensor configured to detect a wavelength component of the light beam for detecting a light source that originates the light beam received by the first and second focus-detecting sensors or received by the third and fourth focus-detecting sensors; and
a second light detection sensor different from the first light detection sensor,
wherein the first light detection sensor is disposed between the first and third focus-detecting sensors or between the second and fourth focus-detecting sensors,
wherein the second light detection sensor is disposed between the first and third focus-detecting sensors or between the second and fourth focus-detecting sensors in a position different from where the first light detection sensor is disposed, and
wherein at least one of the first and second light detection sensors is provided with an optical filter having a predetermined spectral sensitivity characteristic.

13. A focus detecting device comprising:
a photosensor including,
a first focus-detecting sensor and a second focus-detecting sensor configured to receive a light beam from an object so as to detect a first defocus amount of an imaging optical system from a pair of received optical images;
a third focus-detecting sensor and a fourth focus-detecting sensor configured to receive the light beam from the object so as to detect a second defocus amount of the imaging optical system from the pair of received optical images;
a first light detection sensor configured to detect a wavelength component of the light beam for detecting a light source that originates the light beam received by the first and second focus-detecting sensors or received by the third and fourth focus-detecting sensors; and
a second light detection sensor different from the first light detection sensor,
wherein the first light detection sensor is disposed between the first and third focus-detecting sensors or between the second and fourth focus-detecting sensors,
wherein the second light detection sensor is disposed between the first and third focus-detecting sensors or between the second and fourth focus-detecting sensors in a position different from where the first light detection sensor is disposed, and
wherein a spectral sensitivity characteristic of one of the first and second light detection sensors has a higher spectral sensitivity in an infrared light region than the other light detection sensor.

14. A focus detecting device comprising:

a photosensor including,
- a first focus-detecting sensor and a second focus-detecting sensor configured to receive a light beam from an object so as to detect a first defocus amount of an imaging optical system from a pair of received optical images;
- a third focus-detecting sensor and a fourth focus-detecting sensor configured to receive the light beam from the object so as to detect a second defocus amount of the imaging optical system from the pair of received optical images;
- a first light detection sensor configured to detect a wavelength component of the light beam for detecting a light source that originates the light beam received by the first and second focus-detecting sensors or received by the third and fourth focus-detecting sensors;
- a second light detection sensor different from the first light detection sensor; and
- a field lens through which the pair of optical images is projected, wherein the first light detection sensor is disposed between the first and third focus-detecting sensors or between the second and fourth focus-detecting sensors, wherein the second light detection sensor is disposed between the first and third focus-detecting sensors or between the second and fourth focus-detecting sensors in a position different from where the first light detection sensor is disposed, and wherein the first and second light detection sensors detect the pair of optical images passing through the same field lens as for the first to fourth focus-detecting sensors.

* * * * *